United States Patent
Dickerman et al.

(10) Patent No.: US 10,433,614 B1
(45) Date of Patent: Oct. 8, 2019

(54) STATIC DISSIPATION MODIFICATIONS FOR SHOES

(71) Applicants: Robert Leon Dickerman, Northfield, MA (US); Bruce Maxwell Muller, Palm City, FL (US)

(72) Inventors: Robert Leon Dickerman, Northfield, MA (US); Bruce Maxwell Muller, Palm City, FL (US)

( * ) Notice: Subject to any disclaimer, the term of this patent is extended or adjusted under 35 U.S.C. 154(b) by 460 days.

(21) Appl. No.: 15/336,419

(22) Filed: Oct. 27, 2016

(51) Int. Cl.
| | |
|---|---|
| *H05F 3/00* | (2006.01) |
| *A43B 7/36* | (2006.01) |
| *A43B 13/04* | (2006.01) |
| *A43B 13/18* | (2006.01) |
| *H05F 3/02* | (2006.01) |
| *B29D 35/14* | (2010.01) |
| *B29K 75/00* | (2006.01) |

(52) U.S. Cl.
CPC ............. *A43B 7/36* (2013.01); *A43B 13/04* (2013.01); *A43B 13/186* (2013.01); *B29D 35/142* (2013.01); *H05F 3/02* (2013.01); *B29K 2075/00* (2013.01); *B29K 2995/0005* (2013.01)

(58) Field of Classification Search
None
See application file for complete search history.

(56) References Cited

U.S. PATENT DOCUMENTS

| | | | |
|---|---|---|---|
| 3,544,841 A | 12/1970 | Peel | |
| 3,993,932 A * | 11/1976 | Weigl | A43B 7/36 361/224 |
| 4,861,805 A | 8/1989 | Saavedra | |
| 5,448,840 A * | 9/1995 | Cheskin | A43B 7/36 36/32 R |

(Continued)

FOREIGN PATENT DOCUMENTS

| | | |
|---|---|---|
| CN | 1077100 A1 | 10/1993 |
| CN | 202179188 A1 | 4/2012 |
| CN | 103549704 A1 | 2/2014 |
| EP | 1254609 A1 | 11/2002 |

OTHER PUBLICATIONS

ASTM, ASTM F2413-05, Sec. 7.1.5.3 and 5.6, Standard Specification for Performance Requirements for Foot Protection, ASTM International, West Conshohocken, PA, 2005, www.astm.org.

(Continued)

*Primary Examiner* — Stephen W Jackson

(57) ABSTRACT

Disclosed are improved designs for incorporating static dissipative qualities into footwear. A novel static dissipative shoe may be made by incorporating a conductive layer or element that spans the exposed side surface of the sole on the outside of the finished shoe, in at least one location along the perimeter of the sole. A unique advantage is that static dissipative qualities may be incorporated into many existing shoe designs with no tooling changes, by adding a step to the manufacturing process, such as a pad printing step, for instance. Another advantage is that static dissipative qualities may be included at a lower cost, because fewer con- (Continued)

ductive parts and less conductive material are required, as compared to prior art. Yet another advantage is that, unlike for prior art, most embodiments have a negligible effect upon basic shoe performance characteristics, such as shock absorption, support, or wear resistance.

18 Claims, 9 Drawing Sheets

(56) References Cited

U.S. PATENT DOCUMENTS

| | | | | |
|---|---|---|---|---|
| 5,477,577 | A * | 12/1995 | Hadley | A43B 9/16 |
| | | | | 12/142 R |
| 6,820,352 | B2 | 11/2004 | Keidel | |
| 7,017,284 | B2 * | 3/2006 | Keidel | A43B 7/125 |
| | | | | 36/14 |
| 7,424,782 | B2 | 9/2008 | Cheskin | |
| 8,422,191 | B2 | 4/2013 | McEnhill | |
| 2005/0262737 | A1 | 12/2005 | Vattes | |
| 2008/0246296 | A1 | 10/2008 | McQueen | |
| 2009/0001787 | A1 | 1/2009 | Lawall | |
| 2014/0254059 | A1 * | 9/2014 | Kow | A43B 7/36 |
| | | | | 361/223 |

OTHER PUBLICATIONS

Packaged Facts, The Global Footwear Market: Athletic and non-Athletic Shoes, p. 8, Aug. 2009, Packaged Facts, Rockville, MD 20852, http://wulibraries.typepad.com/files/footwear.pdf.

Duquesne, Sophie, et al., Multifunctional Barriers for Flexible Structure: Textile, Leather, and Paper, pp. 63-83, 2007, Springer-Verlag Berlin Heidelburg, New York, NY.

AlphaLab, Inc., Common Static Electricity Problems and Remedies, 2014, http://www.trifield.com/content/fixing-common-static-problems/.

Renkes, Robert N., Fires at Refueling Sites That Appear To Be Static Related—Summary, Mar. 2010, Petroleum Equipment Institute, Tulsa, Oklahoma, http://www.pei.org/Portals/0/resources/documents/Refueling%20Fire%20Incidents.pdf.

American Petroleum Institute, Staying Safe at the Pump, 2014, ,1220 L Street, NW, Washington, DC 20005-4070, http://www.api.org.

Hearn, Graham, The role of static electricity in forecourt fires in Europe, 2000, Wolfson Electrostatics, 32 Church Lane, Highfield, Southampton, SO17 1SZ, United Kingdom.

Hearn, Graham, Can static electricity cause unintentional airbag deployment in vehicles?, 2014, Wolfson Electrostatics, 32 Church Lane, Highfield, Southampton, SO17 1SZ, United Kingdom, http://www.wolfsonelectrostatics.com/04_news/index.html#can-static-electricity-cause-unintentional-airbag-deployment-in-vehicles.

Pratt, Thomas H., Electrostatic Ignitions of Fires and Explosions, p. 80, pp. 101-108, 1997, John Wiley and Sons, 10475 Crosspoint Blvd., Indianapolis, IN 46256.

Barold, S. Serge, Initiation of pacemaker endless loop tachycardia by triboelectricity, Heart 2001:85:248, BMJ, BMA House, Tavistock Square, London WC1H 9JR, United Kingdom.

Read, John, et al., The Shell Bitumen Handbook, pp. 433-435, 2003, Thomas Telford Publishing, 55 McKinley Ave, #D214 White Plains, NY 10606.

* cited by examiner

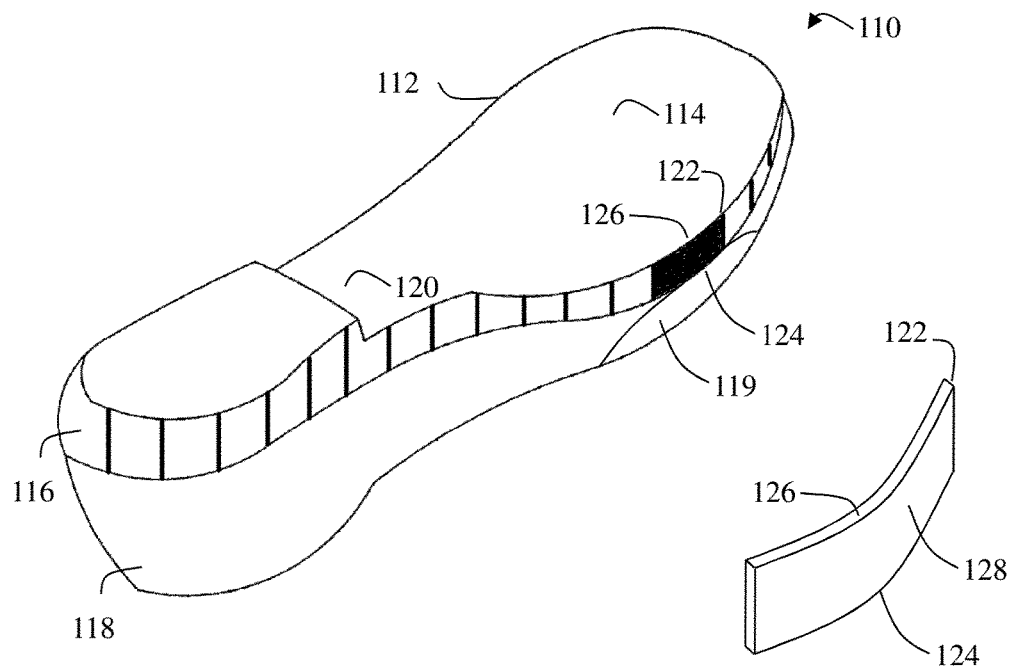
FIG. 1
FIG. 1A
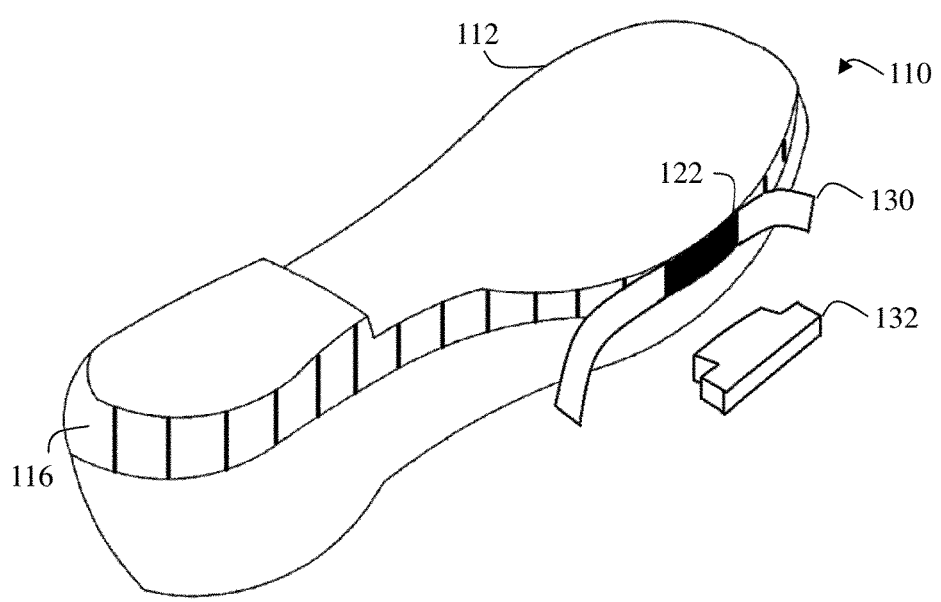
FIG. 1B

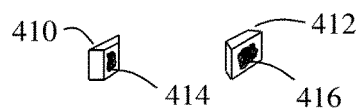
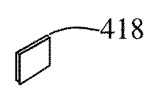
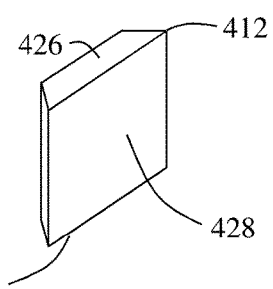
FIG. 4  FIG. 4A
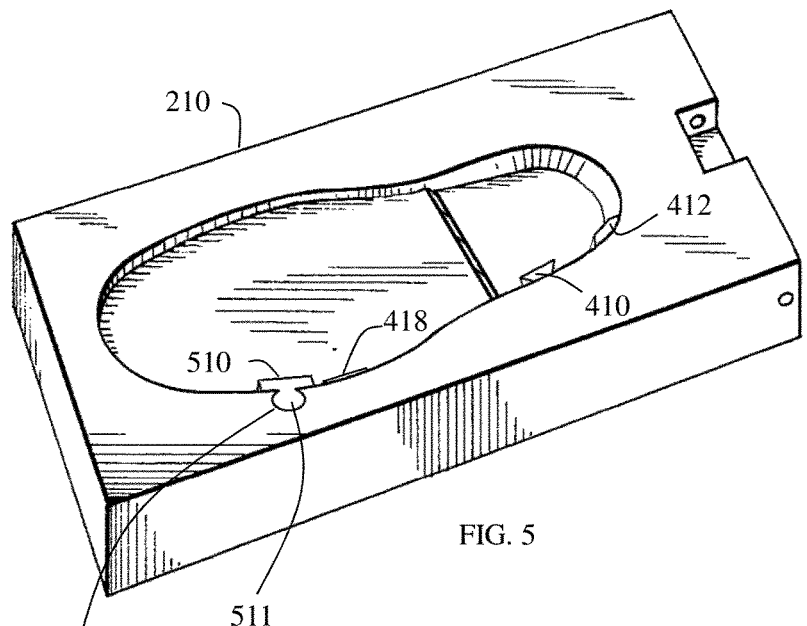
FIG. 5
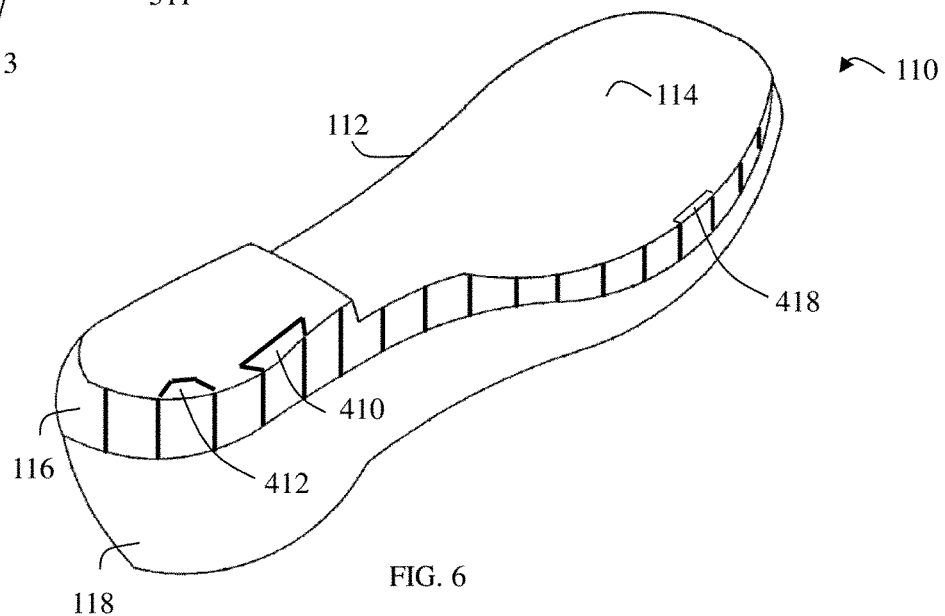
FIG. 6

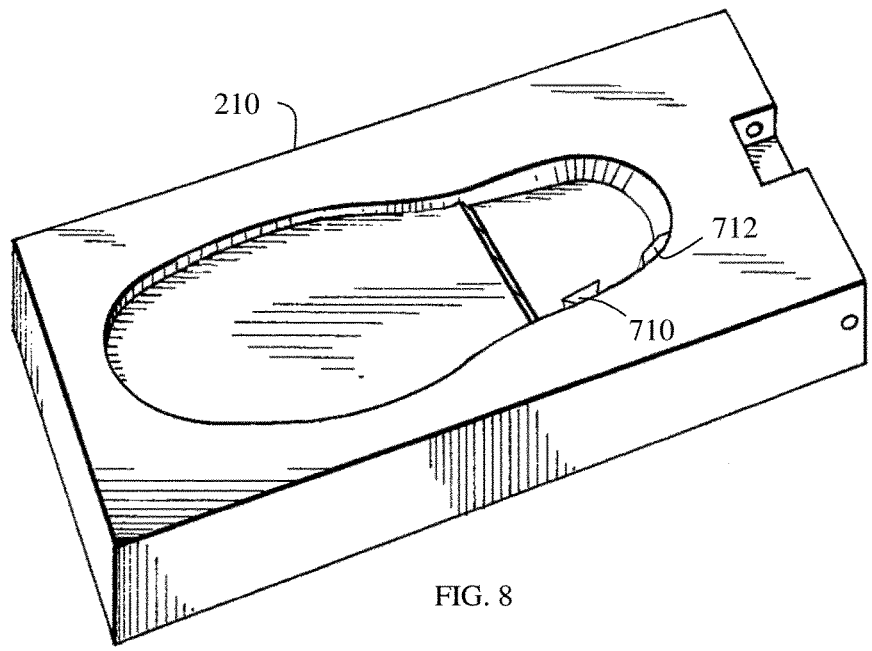
FIG. 7
FIG. 8
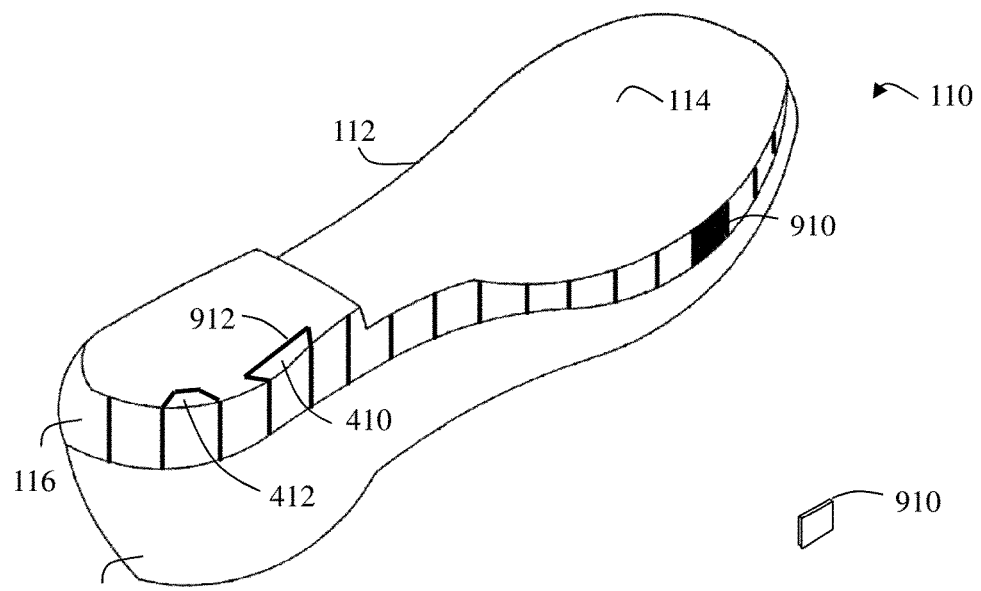
FIG. 9
FIG. 9A

STATIC DISSIPATION MODIFICATIONS FOR SHOES

FIELD OF THE INVENTION

The present invention relates to a method and apparatus for mitigating the incidence and undesirable effects of electrostatic charging and discharging for an individual who is wearing shoes.

BACKGROUND OF THE INVENTION

It has been known in the art for some years that triboelectric charging of the human body can degrade the appearance of footwear and clothing. Static electricity can cause shoes to attract dust, making them look dirty and used. It can also cause sheer garments to cling and clump to the wearer's body, and may cause one's hair to cling and become unruly, especially if one's hair is fine and long. In the fashion world, a great deal of attention and money is spent on the electrostatic problems of clinging clothing and unruly hair. Recent articles that described tactics and products for mitigating "static hair" appeared in New York Magazine, The Huffington Post, and Good Housekeeping, to name just a few.

Furthermore, triboelectric body charging can cause a great deal of discomfort. Many people experience painful and disturbing electrical shocks due to electrostatic discharge (ESD) after walking on carpeting or vinyl flooring.

Even more prevalent and disturbing are shocks and sparks that occur when people exit their vehicles during dry weather. Furthermore, reports by the Petroleum Equipment Institute in 2010 (Renkes, 2010, cited below) suggest that such sparks were likely the cause of almost two hundred fires, some deadly, that occurred when consumers pumped gasoline at filling stations in the U.S., from 1999 to 2004. Numerous other petroleum industry studies (for example, American Petroleum Institute, 2014, cited below) provide evidence of human body charging as the cause of fires. Dozens of patents and patent applications that attempt to address this problem—some recently assigned to major companies, such as General Motors, Honda, and Volkswagen—have been filed and issued in attempts to address these problems, with results that are unsatisfactory due to cost, complexity, unreliability, and ineffectiveness.

Human body triboelectric charging has also been implicated in the unintentional deployment of some vehicle air bags (Hearn, 2014, cited below). Detrimental effects of ESD on pacemaker operation have even been reported (Barold, 2001, cited below).

Most consumer ESD problems are caused by the triboelectric human body charging that occurs when a person's apparel separates from dissimilar materials. This can happen when the person's clothing separates from seating surfaces, or when his or her footwear separates from vinyl flooring while walking, for example. After a person has been charged, the behavior and appearance of clothing and hair may first be adversely affected, as mentioned above. Then, he or she may touch a grounded, uncharged or oppositely charged object, such as a vehicle or an appliance, and be discharged in a painful manner.

To study the ESD problem, the electrostatic voltages of test subjects and other objects were measured with an ACL Model 300B electrostatic field locator. Because it is well-known that the level of humidity of the air often affects electrostatic processes, a UEI Model DTH31 Digital Psychrometer was used to monitor ambient air temperature, relative humidity, and dew point temperature during testing. Internet weather service reports of these same ambient air parameters were also noted during tests.

Initial testing verified that the disturbing ESD that many people experience when exiting their vehicles, for example, is typically caused by human body charging, not vehicle charging. Test vehicle voltages were always found to be essentially zero, regardless of the season or weather conditions; this is thought to be due to the prevalence of mild electrical conductance in modern tires. In contrast, the body voltages of test subjects were found to be quite high at times. It was further observed that the incidence and severity of vehicle-related ESD events seemed to be worse in the autumn than in the winter. Given that lower humidity generally exacerbates ESD problems, this observation initially seemed to contradict the fact that air humidity is typically even lower in the winter than in autumn. However, further testing and observations revealed that, in the winter, subjects' footwear was more likely to be contaminated by substances such as salt, melted snow, and mud. The contaminated footwear had a relatively higher electrical conductance, which effectively connected the subjects to ground, thereby mitigating ESD effects in the winter.

These observations suggested that the use of static dissipative (SD) shoes would be effective for mitigating the problems mentioned above.

Conventional SD shoes have a well-defined conductance that is appropriate for mitigating ESD related to body charging. They have been commercially available for decades, but, until now, their marketing has been focused on niche markets, such as towards workers in the electronics assembly, flammable chemical, and fuels industries. The characteristics of certified SD-rated footwear can be found in ASTM F2413, "Standard Specification for Performance Requirements for Foot Protection" (cited below).

The benefits that would accrue from the wearing of SD shoes by the general public would be significant in the areas of consumer appearance, personal comfort, and safety. Unfortunately, the vast majority of existing shoes have no SD qualities, and the relatively limited number of existing shoes that do have SD ratings have serious disadvantages. Since significant human body charging occurs many hundreds of millions of times per year or more in the U.S. alone, an innovation that will expand the use of SD shoes by the general public is needed.

PRIOR ART

Prior-art relating to SD shoes and the mitigation of the undesirable effects ESD and human body triboelectric charging has been less than satisfactory. The following is a list of some prior art that presently appears relevant:

| Pat. or Pub. No. | Kind Code | Issue or Pub. Date | Patentee or Applicant | Topic |
|---|---|---|---|---|
| U.S. Pat. No. 3,544,841 | | Dec. 1, 1970 | Peel | static discharging footwear |
| U.S. Pat. No. 4,861,805 | | Aug. 29, 1989 | Saavedra et al. | antistatic polyurethane for shoe |

-continued

| Pat. or Pub. No. | Kind Code | Issue or Pub. Date | Patentee or Applicant | Topic |
| --- | --- | --- | --- | --- |
| CN 1077100 | A | Oct. 13, 1993 | | improved footwear |
| U.S. Pat. No. 5,448,840 | | Sep. 12, 1995 | Cheskin | conductive shoe |
| EP 1254609 | A1 | Nov. 6, 2002 | Birke | safety shoe with orthopedic parts |
| U.S. Pat. No. 6,820,352 | B2 | Nov. 23, 2004 | Keidel et al. | waterproof shoe |
| U.S. 2005/0262737 | A1 | Dec. 1, 2005 | Vattes | outsole with optim. material place. |
| U.S. Pat. No. 7,424,782 | B2 | Sep. 16, 2008 | Cheskin | electrically conductive shoe |
| U.S. 2008/0246296 | A1 | Oct. 9, 2008 | McQueen et al. | GM, conductive seats |
| U.S. 2009/0001787 | A1 | Jan. 1, 2009 | Lawall et al. | GM, ionized air seats |
| U.S. Pat. No. 8,422,191 | B2 | Apr. 16, 2013 | McEnhill et al. | Honda, conductive seats |
| CN 103549704 | A | Feb. 5, 2014 | | health-care shoes and socks |
| CN 202179188 | | Apr. 4, 2012 | | versatile shoes |

Non-Patent Literature

ASTM, ASTM F2413-05 Sec. 7.1.5.3 and 5.6, Standard Specification for Performance Requirements for Foot Protection, 100 Barr Harbor Drive, PO Box C700, West Conshohocken, Pa. 19428-2959. F2413-05 has been superseded by F2413-11.
Packaged Facts, The Global Footwear Market: Athletic and non-Athletic Shoes, p. 8, August 2009, Packaged Facts, Rockville, Md. 20852, http://wulibraries.typepad.com/files/footwear.pdf
DUQUESNE, SOPHIE, et al., Multifunctional Barriers for Flexible Structure: Textile, Leather, and Paper, pp. 63-83, 2007, Springer-Verlag Berlin Heidelburg, New York, N.Y.
AlphaLab, Inc., Common Static Electricity Problems and Remedies, 2014, http://www.trifield.com/content/fixing-common-static-problems/
RENKES, ROBERT N., Fires at Refueling Sites That Appear To Be Static Related—Summary, March 2010, Petroleum Equipment Institute, Tulsa, Okla., http://www.pei.org/Portals/0/resources/documents/Refueling%20Fire%20Incidents.pdf.
American Petroleum Institute, Staying Safe at the Pump, 2014, 1220 L Street, NW, Washington, D.C. 20005-4070, http://www.api.org.
HEARN, GRAHAM, The role of static electricity in forecourt fires in Europe, Wolfson Electrostatics, 32 Church Lane, Highfield, Southampton, SO17 1SZ, United Kingdom.
HEARN, GRAHAM, Can static electricity cause unintentional airbag deployment in vehicles?, 2014, Wolfson Electrostatics, 32 Church Lane, Highfield, Southampton, SO17 1SZ, United Kingdom, http://www.wolfsonelectrostatics.com/04_news/index.html#can-static-electricity-cause-unintentional-airbag-deployment-in-vehicles.
PRATT, THOMAS H., Electrostatic Ignitions of Fires and Explosions, p. 80, pp. 101-108, 1997, John Wiley and Sons, 10475 Crosspoint Blvd., Indianapolis, Ind. 46256.
BAROLD, S. SERGE, Initiation of pacemaker endless loop tachycardia by triboelectricity, Heart 2001:85:248, BMJ, BMA House, Tavistock Square, London WC1H 9JR, United Kingdom
READ, JOHN, et al., The Shell Bitumen Handbook, pp. 433-435, 2003, Thomas Telford Publishing, 55 McKinley Ave, #D214 White Plains, N.Y. 10606.
RTP Company, 580 East Front Street, Winona, Minn. 55987, 507-454-6900.
Evonik Industries AG, GoldschmidtstraBe 100, 45127 Essen, Germany, +49 201 173-2229.
BASF Corporation, 500 White Plains Road, Tarrytown, N.Y. 10591, (914) 785-2000.
Avanzare Innovation Tecnologica S.L., C/Jardines 5 (Pol. Ind. Lentiscares, 26370 Navarrete, Spain.

There are many patents that are concerned with static dissipative and conductive shoes. For example, Cheskin, CN 202179188, and CN 103549704 A teach a sole whose entire volume is conductive, including the midsole and innersole, and all include one or more additional conductive parts, such as conductive uppers, conductive adhesives, and conductive socks, as well as conductive connecting strips or wires. In another example, U.S. Pat. No. 3,544,841 issued to Peel, specifies a conductor that completely pierces the central portion of a non-conducting sole.

European Patent EP 1254609 issued to Birke, and U.S. Pat. No. 6,820,352 issued to Keidel et al., teach modifications at the surface of the sole in combination with yet other conductive parts formed on the interior of the shoe, such as extensions of the sole into the interior of the shoe, or anti-static adhesives, for example.

All of the above constructions have the disadvantage of increasing the complexity and cost of the footwear, and many of them have the further disadvantages of degrading shoe mechanical performance and placing vexing constraints on shoe designs, as will be discussed further below.

Nonetheless, despite the many cost and mechanical performance disadvantages of prior-art SD shoes, it was decided to at least test their effectiveness in mitigating electrostatic charging during egress from vehicles.

To first establish a basis for comparison, and the extent of the problem to be solved, body charging was measured on an individual wearing standard non-SD rated athletic shoes. Tests were conducted during the months of March and April, at a time of the year when ambient air is moderately dry. Dewpoint temperatures ranged from $1.0°$ F. to $20.0°$ F., and relative humidities, at ambient temperatures of around $45.0°$ F., were as low as 15.0 percent. A test vehicle was parked on ordinary asphalt pavement. Body voltages were measured to be as high as 30.0 KV immediately after egress. Subsequent testing, with dew point temperatures up to about 40.0 F, yielded similar results. Even after the individual exited the vehicle, he was able to walk a considerable distance away, return to the vehicle many seconds later, and still retain 75% of the initial voltage on his body.

The Minimum Ignition Energy (MIE) of gasoline-air vapors is approximately 0.25 mJ. This corresponds to a human body voltage of approximately 2.2 KV, assuming a body capacitance of 100.0 pF. The 30.0 KV mentioned above corresponds to an energy of 45.0 mJ, or 180.0 times the MIE of gasoline-air vapors. As was alluded to above, it was found that, when wearing standard non-SD shoes, an individual could walk 50 feet from a vehicle after egress, and upon returning to the vehicle, still have an electrostatic body energy of 11.0 mJ, or 44.0 times the MIE for a gasoline-air vapor. In another instance, an individual still retained 22.0 KV, out of an initial 30.0 KV, after walking 30 feet away and returning. This corresponds to an energy of 25.0 mJ, or 100.0 times the MIE for a gasoline-air vapor.

To test the effectiveness of prior-art SD shoes in mitigating these ESD problems, a pair of New Balance 627 SD-rated shoes was acquired. These shoes are specifically designed and manufactured by New Balance to meet ASTM F2413 static dissipation standards. When a subject wore these shoes, the resistance between the subject's body and ground was measured as about 500.0 MΩ. When stepping onto asphalt pavement with them, the subject's body voltage never rose to the high values noted above for non-SD shoes; these results are consistent with published conductivity and conductance numbers for asphalt at mild temperatures (see Pratt, pp. 101-102, Read, et al., above). This proved that SD shoes are effective in mitigating the ESD effects associated with egress from vehicles.

However, the New Balance shoes, as well as most existing SD-rated footwear, are not suitable for the average consumer, because they are intended for industrial use. In fact, a majority of present-day SD shoes are industrial safety shoes. They are not optimized for low mass, support, shock absorption, and comfort, as are typical athletic shoes, or other shoes for casual use. Like the New Balance shoes, most include such industrial-use features as hard steel or polymer toes, extra-rugged upper construction, and enhanced oil resistance, and some are waterproof. In order to meet the stringent conductance requirements of industrial static dissipative shoe standards (ASTM F2413, cited above), they include special conductive outsoles, midsoles, insoles, and upper constructions. Consequently, they are generally larger, heavier and more costly than ordinary athletic shoes, and are not appropriate for the average consumer. Furthermore, even if it were feasible to incorporate such conventional SD construction into existing shoes, this would typically require complete redesigns of the shoes, their manufacturing tooling, and the associated manufacturing processes.

Therefore, in order to reap the benefits of improved comfort, safety, and appearance that are associated with static dissipative qualities in footwear, what is needed is a simple and inexpensive way to retrofit static dissipative qualities into existing shoe designs, as well as a simple and inexpensive way to incorporate static dissipative qualities into new shoe designs.

BRIEF SUMMARY OF THE INVENTION

A novel low-cost SD shoe may be made by incorporating a conductive element comprising a conductive layer, coating, insert, or tape that bridges the exposed side surface of the sole on the outside of a shoe, in at least one location along the perimeter of the sole.

In one aspect of the present invention, a thin layer or coating of conductive material may be deposited on the exposed side surface of the sole on the outside of a finished shoe.

In another aspect of the present invention, a coating of conductive material may be deposited on that surface of a mold cavity corresponding to the exposed side surface of a sole, during the fabrication of that sole, before filling the mold with conventional non-conductive polymer.

In still another aspect of the present invention, a pre-formed conductive insert may be placed on that surface of a mold cavity corresponding to the exposed side surface of a sole, during the fabrication of that sole, before filling the mold with conventional non-conductive polymer.

In another aspect of the present invention, a pre-formed conductive tape or insert may be fastened to the exposed side surface of a sole, or to a molded void in the sole, on the outside of a finished shoe.

In another aspect of the present invention, a portion of the exterior surface of the sole, or the entire surface of the sole, but substantially excluding the inner sole, may be made conductive.

In another aspect of the present invention, a substantial portion of the volume of the sole, or the entire volume of the sole, but substantially excluding the inner sole, may be made conductive.

In another aspect of the present invention, conductive elements of the embodiments may have narrow or pointed shapes.

The additional features and advantages of the disclosed invention are set forth in the detailed description which follows, and will be apparent to those skilled in the art from the description or recognized by practicing the invention as described, together with the claims and appended drawings.

BRIEF DESCRIPTIONS OF THE DRAWINGS

The foregoing aspects, uses, and advantages of the present invention will be more fully appreciated as the same becomes better understood from the following detailed description of the present invention when viewed in conjunction with the accompanying figures, in which:

FIG. 1 is a view of a shoe incorporating a novel static dissipative construction, in accordance with aspects of the present invention;

FIG. 1A is an expanded view of a conductive layer, in accordance with aspects of the present invention;

FIG. 1B is a view of a shoe incorporating a novel static dissipative construction with a conductive hot stamp tape and a hot stamp die, in accordance with aspects of the present invention;

FIG. 4 is a view of some conductive inserts, in accordance with aspects of the present invention;

FIG. 4A is an expanded view of a conductive insert, in accordance with aspects of the present invention;

FIG. 5 is a view of a mold for an sole of a shoe, showing some conductive inserts applied to the mold cavity, in accordance with aspects of the present invention.

FIG. 6 is a view of a shoe incorporating novel static dissipative inserts, in accordance with aspects of the present invention;

FIG. 7 is a view of some mold attachments, in accordance with aspects of the present invention;

FIG. 8 is a view of a mold for an sole of a shoe, showing some mold attachments in place, in accordance with aspects of the present invention.

FIG. 9 is a view of a shoe incorporating novel static dissipative inserts, in accordance with aspects of the present invention;

FIG. 9A is a view of a conductive tape, in accordance with aspects of the present invention;

Figure 2:
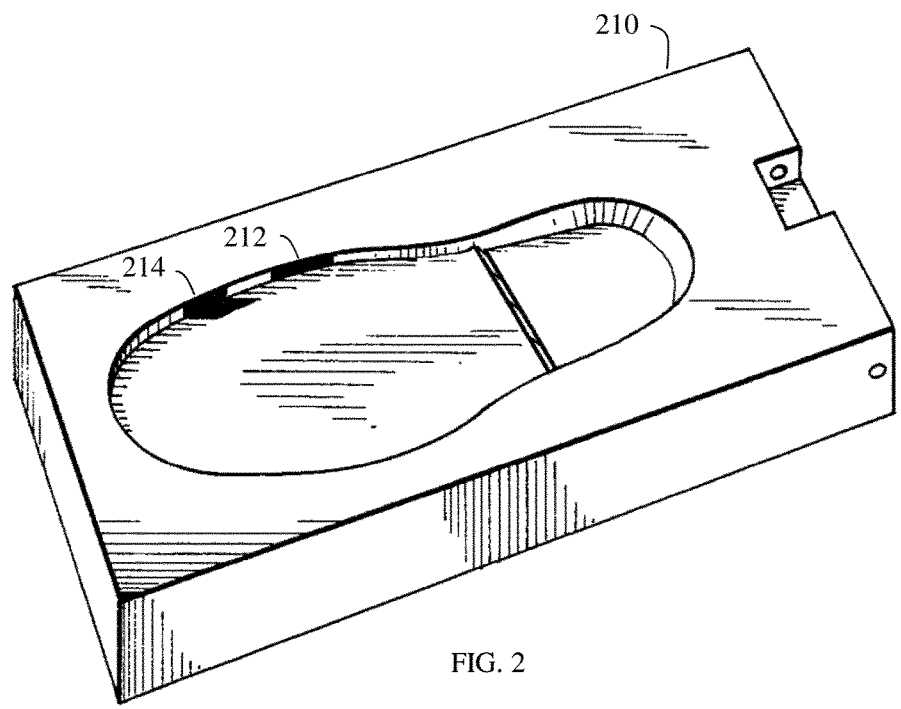
FIG. 2 is a view of a mold for an sole of a shoe, showing a thin coating of conductive material applied to certain regions of the mold cavity, in accordance with aspects of the present invention.

| REFERENCE NUMERALS | |
|---|---|
| 110 | shoe |
| 112 | sole |
| 114 | bottom surface |
| 116 | side surface |
| 118 | upper |
| 119 | porous part |
| 120 | arch |
| 122 | conductive layer |
| 124 | first end |
| 126 | second end |
| 128 | outer exposed surface |
| 130 | tape |
| 132 | die |
| 210 | mold |
| 212 | conductive coating |
| 214 | extended conductive coating |
| 224 | first end |
| 226 | second end |
| 228 | outer exposed surface |
| 230 | extension |
| 232 | bottom surface |
| 410 | dovetailed conductive insert |
| 412 | conductive insert |
| 414 | adhesive |
| 416 | adhesive |
| 418 | IMD film |
| 424 | first end |
| 426 | second end |
| 428 | outer exposed surface |
| 510 | eared conductive insert |
| 511 | handle |
| 513 | cavity |
| 710 | dovetailed mold attachment |
| 712 | mold attachment |
| 910 | conductive tape |
| 912 | receptive cavity |
| 914 | conductive layer |
| 916 | top surface |
| 918 | conductive sole |
| 920 | bottom surface |
| 922 | side surface |
| 924 | top surface |
| 1010 | pointed conductive element |

-continued

| REFERENCE NUMERALS | |
|---|---|
| 1012 | line conductive element |
| 1110 | ground |
| 1200 | stackup diagram |
| 1210 | ground |
| 1212 | upper region |
| 1214 | sole layer |
| 1216 | contact resistance |
| d | creepage distance (over surface of edge of sole) |
| 1300 | first bar graph |
| 1400 | second bar graph |
| 1402 | leftmost group of bars |
| 1404 | middle group of bars |
| 1406 | rightmost group of bars |
| 1500 | third bar graph |
| 1502 | leftmost bar |
| 1504 | middle bar |
| 1506 | rightmost bar |

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention.

The present invention relates generally to devices and methods that may be used to inexpensively add the feature of static dissipation to new shoe designs, as well as to easily and inexpensively retrofit existing shoe designs to provide them with static dissipative qualities.

It is common for there to be several distinct components in a shoe sole, including the outer sole, the inner sole, and the midsole. The outer sole of a shoe is that part of a shoe's sole that would normally contact the ground when worn, that is visible from the outside of the shoe, and whose material composition is typically optimized for good wear resistance and appearance. The inner sole is that part that is visible on the inside of the shoe, and that would normally contact the wearer's sock or foot, and whose material composition is typically optimized for good breathability and cushioning. The outer sole and inner sole are sometimes separated by an intermediate component, called the midsole, that is typically designed to further improve cushioning.

Thin Layer of Conductive Material Applied to Sole of Finished Shoe

Referring to FIG. 1, a shoe 110 with sole 112 is depicted. Sole 112, as defined here, comprises the part of shoe 110 that is substantially visible from the outside of shoe 110 and that normally contacts the ground when a person wearing shoe 110 is standing up. Sole 112 includes the outer sole of shoe 110, and may include a midsole (not shown), if present. However, as defined here, sole 112 does not substantially include any inner sole (not shown) that may be present in shoe 110. Therefore, as defined here, sole 112 will not typically come into direct contact with a person wearing shoe 110, because an intervening inner sole (not shown) will typically separate sole 112 from the person. The side surface 116 of sole 112 comprises the part of shoe 110 that is substantially visible from the outside of shoe 110 and that is beneath upper 118 when a person wearing shoe 110 is standing up. The side surface 116 of sole 112 is indicated in the drawing by the vertically hatched area. Referring to FIG. 1, a first embodiment may be implemented by depositing a thin conductive layer 122 on a portion, at least, of side surface 116 of sole 112 in finished shoe 110. Referring to FIG. 1A, in one embodiment, conductive layer 122 substantially has a sheet shape whose outer exposed surface 128 substantially conforms to the shape of side surface 116 of sole 112. Conductive layer 122 has a first end 124 disposed in proximity to the upper 118 of shoe 110, and has a second end 126 disposed in proximity to the bottom surface 114 of sole 112 of shoe 110. The breakdown voltage and the resistance between the body of a person wearing shoe 110 and a ground upon which the person stands will be reduced due to the proximity of first end 124 to upper 118, and due to the proximity of second end 126 to the ground, thereby increasing the discharging of electrostatic energy from the person's body to the ground. In other words, this construction will significantly increase the conductance of the connection between the body of the wearer and the surface he or she places his or her shod feet upon, and will significantly reduce the breakdown voltage of the dominant insulating barrier of shoe 110, as will be described in more detail in the Operation section. A shoe, so constructed, will allow electrostatic charge to bleed from the body into the ground more easily.

Conductive layer 122 may be made by applying conductive paint or ink to side surface 116 of sole 112. Conductive paint and ink are available commercially, but may also be made by mixing non-conductive paint or ink with conductive materials such as metal powder, conductive metal pigments, or carbon black (Pratt, p. 80, above), for instance. If the paint or ink is not transparent or of a color that matches that of sole 112, it may be incorporated as a decorative artwork on shoe 110. Inks that are cured by the application of ultraviolet light may offer good durability. Conventional printing methods such as pad printing, stamp printing, or silk-screening, for example, may be used to apply conductive paint or ink, thereby forming conductive layer 122. Pad printing may be particularly suitable in this application, as it is routinely used to print artwork on non-flat product surfaces. In pad printing, a highly flexible silicone rubber transfer pad is typically used to lift ink from the cavities of a printing plate that incorporates the artwork; the inked pad is then pressed against the product to transfer the ink to the product. Alternatively, conductive layer 122 may be applied using liquid paint or ink by conventional dipping, brushing, or spraying processes. In anther embodiment, conductive layer 122 may be formed using ink-jet printing and laser printing.

In one embodiment of shoe 110, the ratio of the volume of conductive layer 122 to the total volume of sole 112 can be as little as 0.0001%, if a 0.0005 inch thick conductive layer 122 is applied, and only a 0.05 inch wide strip of side surface 116 is modified. In other embodiments, the ratio of the volume of conductive layer 122 to the total volume of sole 112 can be as high as 3.0%, if a 0.1 inch thick conductive layer 122 is applied, and the entire side surface 116 is modified.

Conductive layer 122 may be a conductive polymer dispersion prepared as a coating, and applied by dip, brush or spray methods, for instance. An example of such a commercially available coating is ACL Staticide 6300. The material cost of this coating may be as little as $0.02 per shoe, if 12.0 square inches are treated with a 0.0005 inch thick layer. It is supplied as a water-based acrylic dispersion, but it will not wash off with water after application and curing; curing is done by drying at ambient or elevated temperature. It has a sheet resistivity of 10.0 MΩ per square to 100.0 MΩ per square. It is translucent, and is visually almost undetectable on most colored sole materials after curing, so it may be applied to most shoes without affecting their appearance (it may be visible on certain glossy white materials). Consequently, such a coating may be easily applied at very low production cost to existing shoe designs by adding a single step at the end of the manufacturing process. This allows a shoe manufacturer to introduce the feature of static dissipation to entire existing product lines with no development, redesign or tooling costs.

In one embodiment, shoe 110 includes a conductive layer 122 extending over the entire side surface 116 of sole 112 formed as a conductive polymer dispersion applied to the sided surface. In other embodiments, the polymer dispersion is only applied to a portion of side surface 116.

Alternatively, conductive layer 122 may be a layer of a polymer forming sole 112 that is made permanently conductive by the fusion, diffusion, or infusion of a conductive substance into a surface of sole 112, under heat or pressure. One way to accomplish this is to use hot stamping, a conventional and widely-used plastics decorating process.

Accordingly, referring to FIG. 1B, in one embodiment, conductive layer 122 is formed by hot stamping or fusing a conductive ink, conductive polymer, metal foil or metalized polymer foil onto side surface 116 of sole 112. Conductive layer 122 may be formed of a dry conductive ink, dry conductive polymer ink, metal foil or metalized polymer supplied on a hot stamp carrier ribbon or tape 130. A hot stamp tape 130 may also carry adhesive, lacquer, and release layers, but may be most effective if the exposed top surface is conductive. Tape 130 may be positioned over sole 112, and a heated die 132, which may incorporate artwork and lettering, may be pressed against tape 130 to melt the ink or polymer or adhesive and fuse it to the sole. When the tape is peeled away from the base object, a conductive layer that incorporates the artwork of the die is left behind on the sole. The Polyfuse™ process, by the Polyfuse Graphics™ Corporation, is an example of a commercially-available, post-mold hot stamping process for fusing durable pigmented plastic graphics onto plastic products, as just described.

In another embodiment, conductive layer 122 is attached to sole 112 using heat transfer printing, a conventional process that is related to hot stamping, and which may be used in a manner similar to that described above for hot stamping.

Although it may be used to enhance a new shoe design, an advantageous aspect of the embodiments disclosed above and depicted in FIGS. 1, 1A, and 1B, is that an existing sole design, even a complicated one incorporating multiple sections of different compressible foamed urethanes, as well as gas cavities, for example, may be easily retrofitted with static dissipative qualities, without appreciably modifying the original sole fabrication process, and, in some cases, without appreciably modifying the appearance of the original shoe. This may be accomplished by forming conductive layer 122 on the sole 112 of an otherwise finished shoe 110 by applying a conductive ink, paint, powder, liquid polymer dispersion, polymer tape, or metal foil, by brushing, spraying, printing, hot stamping or heat transfer printing, as described above. The embodiments may even be used by a manufacturer to improve existing inventories of finished shoes, or by a consumer to improve shoes that he or she already owns.

Thin Layer of Conductive Material Applied to Sole Mold Cavity

The soles of modern shoes are often made using injection molding. Alternatively, a preformed or pelletized polymer may be formed into a sole by compression or transfer molding. Open-pour molding of a liquid thermosetting polymer or molten thermoplastic polymer such as polyurethane (PU), thermoplastic polyurethane (TPU), or polyvinyl chloride materials such as plastisol or organisol, may be used. Thermoplastic polymers are in a solid state when at room temperature, and are liquefied by heat and shear before filling a mold; the polymer sets, reverting to a solid state, upon cooling. Thermosetting polymers may be in a liquid or solid state before they are cured; after a mold is filled, the polymer is usually cured with a combination of heat and pressure. The thermosetting process is irreversible. Many existing shoe designs include laminations of different plastics, with different colors, densities, cushioning qualities, and abrasion resistances. These are constructed by fastening different sole components together either with adhesives or by bonding them together with heat and pressure, or by partially filling molds with layers of different plastics and curing, sequentially.

Accordingly, referring to FIG. 2, in another embodiment of the present invention, a conductive coating 212 is formed by applying a thin layer or coating of conductive material to a portion of the cavity surface of a mold 210 used to fabricate sole 112, prior to filling the mold with a standard, non-conductive polymer. This process may be considered a variation of In Mold Coating (IMC). Conductive coating 212 is indicated in FIG. 2 by a shaded area in the cavity of mold 210. Conductive coating 212 is applied to a portion of the cavity in mold 210 used to form side surface 116 of sole 112 in finished shoe 110 of FIG. 3. As a final result, conductive coating 212, shown in FIG. 3 in a finished shoe 110, and shown separately in FIG. 3A, defines a conductive layer having an outer exposed surface 228 that substantially conforms to the shape of side surface 116 of sole 112. Conductive coating 212 may comprise an initially liquid phase conductive polymer—either cold, if thermosetting, or molten, if thermoplastic. Alternatively, conductive coating 212 may comprise a conductive paint or conductive ink. Conductive coating 212 may be brushed, rolled, dipped, poured, injected, stamped, printed, or sprayed into the cavity of mold 210.

A liquid polymer conductive coating 212 may be cured, or partially cured, or set, by heating, cooling, or exposure to ultraviolet (UV) light, before filling mold 210 with a conventional non-conductive polymer to form the main body of sole 112. Alternatively, mold 210 may simply be pre-heated before a thermosetting polymer conductive coating 212 is applied to mold 210.

Advantageous aspects of this embodiment include that conductive coating 212 may be more durable than coatings that are applied to the sole in a final manufacturing step after shoe 110 has been fabricated. Also, conductive coating 212 formed by applying coating material into mold 210 prior to forming sole 112 may be implemented with no tooling changes to mold 210.

Figures 3, 3A, 3B:
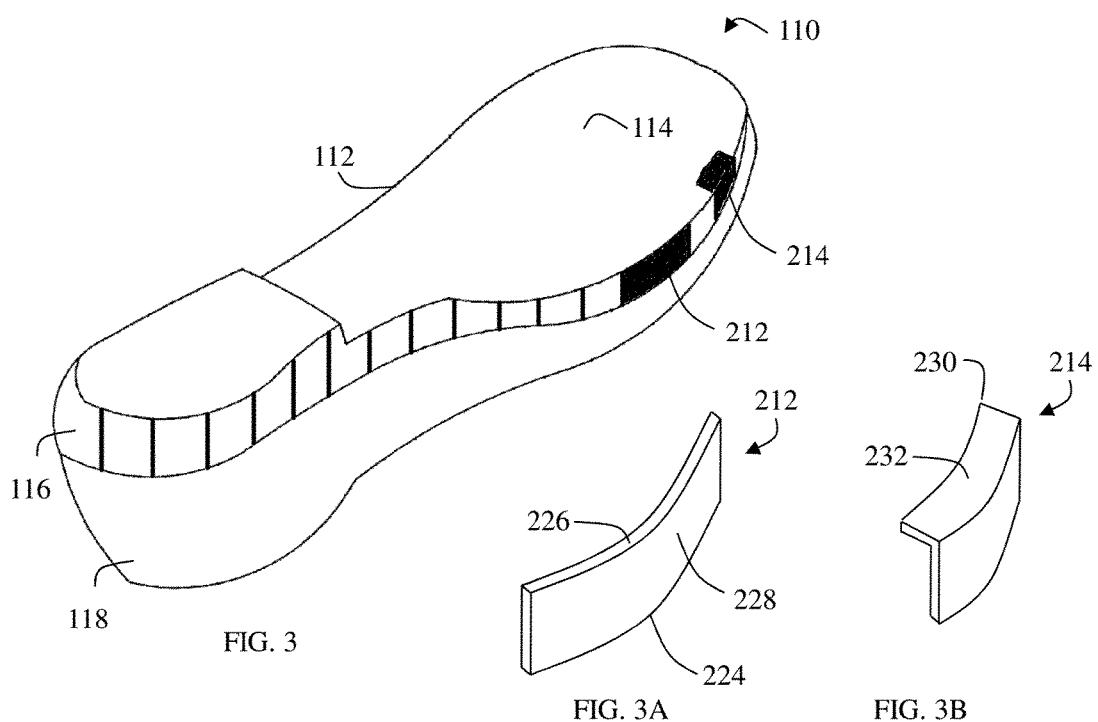
FIG. 3 is a view of a shoe and some novel static dissipative constructions, in accordance with aspects of the present invention.
FIG. 3A is an expanded view of a conductive coating, in accordance with aspects of the present invention.
FIG. 3B is an expanded view of an extended conductive coating, in accordance with aspects of the present invention.

Referring to FIG. 3A, conductive coating 212 has a first end 224 disposed in proximity to the upper 118 of shoe 110, shown in FIG. 3, and has a second end 226 disposed in proximity to, or actually forming a portion of, the bottom surface 114 of sole 112 of finished shoe 110. The breakdown voltage and the resistance between the body of a person wearing shoe 110 and a ground upon which the person stands will be reduced, due to the proximity of first end 224 to upper 118, and due to the proximity of second end 226 to the ground, thereby increasing the discharging of electrostatic energy from the person's body to the ground.

Referring to FIGS. 3 and 3B, an extended conductive coating 214 includes a conductive extension 230 that extends a conductive coating from side surface 116 to bottom surface 114 of sole 112. A bottom surface 232 of extension 230 provides an increased contact area with a ground that a person may stand upon, whereby contact resistance between the ground and extended conductive coating 214 may be reduced.

Alternatively, conductive coating 212 may be created by dusting the cavity of mold 210, or a portion of the mold 210 cavity, with a powder form of conductive polymer, metal, or carbon black, prior to filling it with conventional non-conductive polymer. Conductive polymer powders may be formulated to melt and gel on contact with a hot mold.

Conventional multi-shot In Mold Decorating (IMD) may be used to form conductive coating 212, but a multi-shot IMD fabrication process may require investment in more complex tooling.

In other embodiments, intrinsically conductive compounds, and conductive additives that are mixed with a non-conductive base polymer to make conductive polymer compounds, are commercially available (Duquesne, above, p. 72 and p. 81), and may be suitable for the conductive material used for the conductive coating 212 described above. Some examples are Permastat®, ORTEGOL® AST, Elastostat, and AVANSTATIC-PU (RTP, Evonik, BASF, and Avanzare, cited above). Some of these additives are suitable for use with either polyether or polyester polyurethanes (PU), or both.

In one embodiment, a 0.0005 inch thick and 0.05 inch wide conductive coating 212 is formed. For this embodiment, the ratio of the volume of conductive coating 212 to the total volume of sole 112 will be approximately 0.0001%. This may be advantageous if the cost of conductive material is high relative to that of non-conductive material. In another embodiment, a 0.1 inch thick conductive coating 212 is formed over the entire side surface 116. For this embodiment, the ratio of the volume of conductive coating 212 to the total volume of sole 112 will be approximately 3.0%. This may be advantageous if greater durability and greater electrostatic discharging efficacy is desired.

Pre-Formed Conductive Insert Applied to Sole Mold Cavity

In another embodiment, one or more preformed conductive inserts may be placed into the cavity of mold 210 at locations that define side surface 116 of sole 112, before mold 210 is filled with a conventional non-conductive polymer during the sole fabrication.

Referring to FIG. 4, a conductive insert 412 is pre-formed, and may comprise a molded, extruded, or otherwise pre-formed conductive polymer compound. Any of the conductive polymer materials or mixtures mentioned in the descriptions of the embodiments hereinabove may be suitable for the fabrication of conductive insert 412. Referring to FIG. 4A, conductive insert 412 defines a sheet or slab of conductive material with a rectangular perimeter, configured so that an outer exposed surface 428 substantially conforms to the shape of side surface 116 of sole 112. Conductive insert 412 may be furnished with adhesive 416, as shown in FIG. 4, for temporary fastening to mold 210, as shown in FIG. 5. After mold 210 is filled with a conventional non-conductive polymer during sole fabrication, and the polymer cools or cures, conductive insert 412 becomes an integral part of sole 112. In FIG. 6, conductive insert 412 is shown in finished shoe 110. Such inserts may be used at one or more locations on side surface 116 of sole 112.

Referring to FIGS. 4A and 6, conductive insert 412 has a second end 426 disposed in proximity to the upper 118 of shoe 110, and has a first end 424 disposed in proximity to, or actually forming a portion of, the bottom surface 114 of sole 112 of finished shoe 110. The breakdown voltage and the resistance between the body of a person wearing shoe 110 and a ground upon which the person stands will be reduced, due to the proximity of second end 426 to upper 118, and due to the proximity of first end 424 to the ground, thereby increasing the discharging of electrostatic energy from the person's body to the ground.

In other embodiments, other perimeter shapes, such as trapezoidal, triangular, or oblong, for example, may be used for conductive insert 412, provided that first end 424 and second end 426 of conductive insert 412 are proximate to bottom surface 114 of sole 112, and to upper 118, respectively, in finished shoe 110.

The shapes of the edges of the conductive inserts may be modified. For example, in another embodiment, dovetailed conductive insert 410, shown in FIGS. 4, 5, and 6, defines dovetail shaped edges on it's perimeter that may provide more secure bonding to sole 112. Dovetailed conductive insert 410 may be furnished with adhesive 414 for temporary fastening to mold 210.

In another embodiment, a conductive insert may define a conductive band (not shown) that goes part of the way or all of the way around side surface 116 of sole 112.

In other embodiments, conductive inserts 410, 412 may be small pre-formed metal parts or carbon fiber parts, especially if they are used in only a single location, or a small number of locations, along side surface 116 of sole 112. For example, conductive inserts 410, 412 may be small molded or stamped aluminum parts, incorporated into a shoe for a modest cost. Conductive inserts 410, 412 may be configured as an attractive adornment including various designs, like jewelry. Because of this, it is conceivable that, in high-end products, precious metals such as silver, platinum, or gold might be desirable as conductive materials for conductive inserts 410, 412.

One advantage of conductive inserts 410, 412 is that they may provide a more durable conductive component than paints or other thin coatings that are applied to an otherwise complete shoe. Another advantage is that the material cost of the conductive polymer may be reduced to a small fraction of that for a conventional, full-solid-volume conductive sole, because the total volume of conductive material used by the insert may be quite small in proportion to the entire volume of sole 112. Another possible advantage is that ends 424, 426 of conductive insert 412, for example, may have more surface area compared to ends 124, 126 of conductive layer 122 or ends 224, 226 of conductive coating 212. This is because the ends 424, 426 may be thicker than ends 124, 126, 224, 226. If, in use, ends 426, 424 come into direct contact with upper 118 or the ground upon which a person stands, respectively, a greater surface area may reduce the contact resistance between insert 412 and upper 118 or the ground, thereby resulting in better discharging of the person.

In many implementations of this embodiment, existing mold 210 may be used without any tooling changes whatsoever; all that is needed is to supply the sole manufacturing line with the new conductive inserts 410, 412. Conductive inserts 410, 412 may be placed on the edge of the existing mold 210 before it is filled with the conventional non-conductive polymer of the existing manufacture. Referring to FIG. 4, adhesive 414, 416 may be provided between conductive inserts 410, 412 and mold 210, and mold 210 may be scoured or burnished at the sites of application to enhance adhesion.

Referring to FIG. 4, in another embodiment, a conductive insert comprises an In Mold Decorating (IMD) film 418 that incorporates a conductor formed of a thin, dry conductive polymer film or foil. In the plastics industry, IMD films may also be known as IMD foils, In Mold Labels, Molding Graphics, or In Mold Graphics. IMD film 418 may also be furnished with an adhesive layer (not shown) for temporary fastening to mold 210. In FIG. 5, IMD film 418 is shown being temporarily fastened to mold 210. As before, after mold 210 is filled with a conventional non-conductive polymer during sole fabrication, and the polymer cools or cures, the conductive material of IMD film 418 becomes an integral part of sole 112. In FIG. 6, the conductive material of IMD film 418 is shown in finished shoe 110. Similarly to conductive inserts 410, 412, the IMD film 418 should substantially span side surface 116 of sole 112 on, at least, a portion of the periphery of the sole, with a first end in close proximity to the ground, and a second end in close proximity to upper 118.

Again, an adhesive layer (not shown) may be provided between IMD film 418 insert and mold 210, and mold 210 may be scoured or burnished at the sites of application to enhance adhesion. In one embodiment, the conductive polymer of IMD film 418 polymer has an identical or similar chemical composition to the base material of sole 112, so that after setting or curing, IMD film 418 may be fused to the base material of sole 112, forming a strong mechanical bond therebetween. An example of a manufacturer of In Mold Graphics that are composed of pigmented plastic, versus inks, is Mold In Graphic Systems®. A strong mechanical bond may likewise be formed between sole 112 and conductive inserts 410, 412 in embodiments using conductive inserts 410, 412, if inserts 410, 412 have an identical or similar chemical composition to the base material of sole 112.

Referring to FIG. 5, in another embodiment, a conductive insert 510 is provided with a temporary protruding handle 511 (to be cut off after molding) that interlocks with a corresponding cavity 513 on the mold. This is illustrated by conductive insert 510 in FIG. 5. In yet another embodiment, conductive inserts 410, 412 may incorporate a hole or holes to accept a conventional locating pin (not shown) that is fastened to mold 210. The latter two alternatives, although they may require tooling changes, provide more reliable registration of conductive inserts 410, 412 relative to sole 112, particularly in a high-pressure molding process.

Similarly to conductive layer 122 of FIG. 1 and conductive coating 212 of FIGS. 2 and 3, an important dimensional requirement of conductive insert 410, 412 or 418 is that its conductive surface spans substantially the entire thickness (that is, along the vertical lines of the hatching in FIG. 6) of side surface 116 of sole 112, from upper 118 to the bottom surface 114 of sole 112, in at least one place along the perimeter of sole 112 that normally touches the ground when standing. Consequently, if, for example, arch 120 (shown in FIG. 1) is elevated, it may be preferable to locate any conductive element, layer, coating or insert away from arch 120, and closer to a part of side surface 116 of sole 112 that is underneath the ball or heel of the wearer's foot, for example, because these parts touch the ground when the wearer is standing, in most shoe designs. These parts of the sole are referred to as the ball and heel of the sole, respectively.

In one embodiment, a 0.0005 inch thick and 0.05 inch wide conductive IMD film 418 is employed as the conductive insert. For this embodiment, the ratio of the volume of conductive material to the total volume of sole 112 will be approximately 0.0001%. This may be advantageous if the cost of conductive material is high relative to that of non-conductive material. In another embodiment, a 0.4 inch thick conductive tape (not shown) is employed as the conductive insert, and the entire side surface 116 of sole 112 is modified. For this embodiment, the ratio of the volume of conductive material to the total volume of sole 112 will be approximately 10.0%. This may be advantageous if greater durability and greater electrostatic discharging efficacy is desired.

Pre-Formed Conductive Tape or Insert Applied to Sole of Finished Shoe

Referring to FIGS. 9 and 9A, in another embodiment, a pre-molded or pre-formed conductive tape 910 may be bonded to side surface 116 of sole 112 of a nearly-completed shoe 110, by using a conventional adhesive, or by using a conventional heat bonding process, or any other conventional fastening method. Conductive tape 910 has a sheet shape whose surfaces substantially conform to the shape of side surface 116 of sole 112. Conductive tape 910 may comprise a conductive polymer, or even a sheet metal. An advantageous aspect of conductive tape 910 is that an existing sole 112 design may be easily retrofitted with SD qualities by attaching conductive tape 910 to sole 112, without modifying the original sole fabrication process, and no other conductive component or material is required. Conductive tape 910 may also be used by a manufacturer to improve existing inventories of finished shoes, or even purchased and installed by a consumer to improve shoes that he or she already owns.

In yet another embodiment, shoe 110 may include one or more solid conductive inserts 410, 412 bonded to a matching cavity in side surface 116 of sole 112 in otherwise completed shoe 110. Referring to FIG. 7, a mold attachment 712 of the same shape as conductive insert 412 of FIG. 4 may be fabricated. Referring to FIG. 8, mold attachment 712 may be fastened to mold 210 to create a receptive cavity in side surface 116 and sole 112 during fabrication of sole 112. Referring to FIG. 9, after sole 112 is molded, conductive insert 412 is bonded to sole 112 using an adhesive, or by fusing conductive insert 412 to sole 112 via a heat and pressure process.

Pre-formed conductive inserts 410 and 412 may be removable. In this case, if pre-formed replacement inserts are provided by a manufacturer, the inserts may be replaced at the convenience of the user, thereby allowing the user to select and install a replacement conductive insert of same shape but with different characteristics, including, but not limited to, material, color, and ornamental design.

In one embodiment, one of a ball-and-socket snap-fit, a hook snap-fit, or an annular snap-fit, for example, or another type of locking joint, such as a dovetail joint, may also be used to help secure the insert. An example of a conductive insert with a mechanical interlock is illustrated in FIG. 4 by dovetailed conductive insert 410, that was previously described. Referring to FIG. 7, a dovetailed mold attachment 710 of the same shape as dovetailed conductive insert 410 may be fabricated. Referring to FIGS. 8 and 9, mold attachment 710 may be fastened to mold 210 to create a receptive cavity 912 in side surface 116 and sole 112 during fabrication of sole 112. Referring to FIG. 9, after sole 112 is molded, dovetailed conductive insert 410 may be inserted into sole 112, and bonded, therein using an adhesive or heat and pressure fusing as set forth above.

Entire Surface of Sole Being Conductive

Figures 9B, 9C:
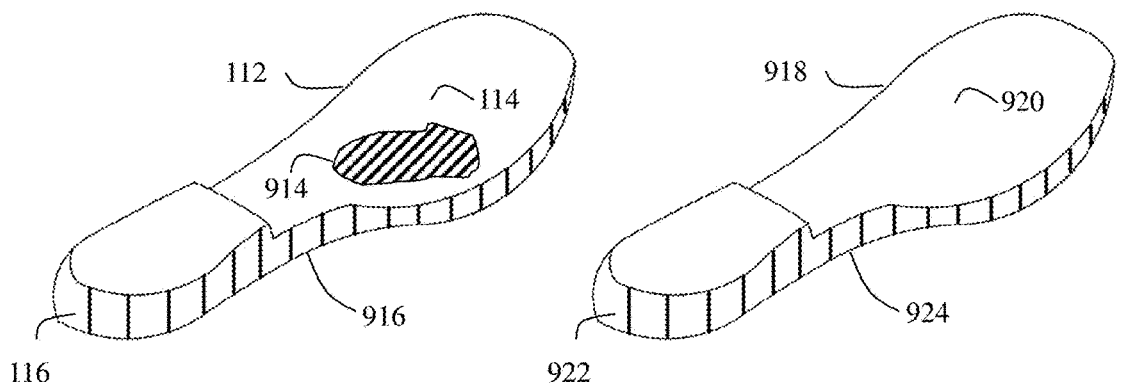
FIG. 9B is a view of an sole of a shoe partially treated with a conductive layer to produce a conductive surface, in accordance with aspects of the present invention.
FIG. 9C is a view of a conductive sole of a shoe, in accordance with aspects of the present invention.

Referring to FIG. 9B, in another embodiment, sole 112 is modified during an interim manufacturing step, before sole 112 is fastened to upper 118. Sole 112 is modified by forming, using the methods and materials described hereinabove, a conductive layer 914 over substantially the entire surface of sole 112. In FIG. 9B, only a portion of conductive layer 914 is depicted on bottom surface 114 of sole 112, to help to distinguish in the figure between conductive layer 914 and sole 112, but in this embodiment, conductive layer 914 is formed on side surface 116, bottom surface 114, and a top surface 916 of sole 112, so that substantially the entire surface of sole 112 is enshrouded by conductive layer 914. After assembly to a shoe upper (not shown), that portion of conductive layer 914 formed on side surface 116 is partially disposed in proximity to the upper, and that portion of conductive layer 914 formed on bottom surface 114 is disposed in proximity to, or in contact with, a ground upon which a person wearing the shoe stands. The breakdown voltage and the resistance between the body of the person and the ground will be reduced due to the proximity of conductive layer 914 to the upper and to the ground. No other conductive components are required.

Entire Volume of Sole Being Conductive

Referring to FIG. 9C, in another embodiment, a sole 918 is depicted. Sole 918, as defined here, comprises the part of a shoe that is substantially visible from the outside of a shoe and that is beneath the upper of the shoe when a person wearing the shoe is standing up. Sole 918 includes an outer sole, and may include part or all of a midsole, if present. However, sole 918 does not substantially include any inner sole that might be present in a shoe. Therefore, as defined here, sole 918 will not typically come into direct contact with a person wearing a shoe, because an intervening inner sole will typically separate sole 918 from the person.

In this embodiment, substantially the entire sole 918 is formed of a conductive material, using the methods and materials described hereinabove. Hence, the side surface 922, the bottom surface 920, the top surface 924, and the inner regions (not shown) of sole 918 are all conductive. This will provide a lower ground contact resistance and greater durability, albeit at the cost of a higher volume of conductive material. After assembly to a shoe upper (not shown), a portion of conductive side surface 116 is partially disposed in proximity to the upper, and a portion of conductive bottom surface 920 is disposed in proximity to, or in contact with, a ground upon which a person wearing the shoe stands. The breakdown voltage and the resistance between the body of the person and the ground will be reduced due to the proximity of conductive sole 918 to the upper and to the ground. No other conductive components are required. An advantageous aspect of this embodiment is that the property of static dissipation may be added to a shoe design by merely mixing a conductive additive to the base material used to fabricate sole 112 before molding.

Conductive Element with Pointed or Narrow Shape

Figure 10:
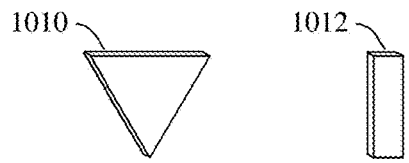
FIG. 10 is a view of two conductive surface elements having different geometries, in accordance with aspects of the present invention.
Figure 11:
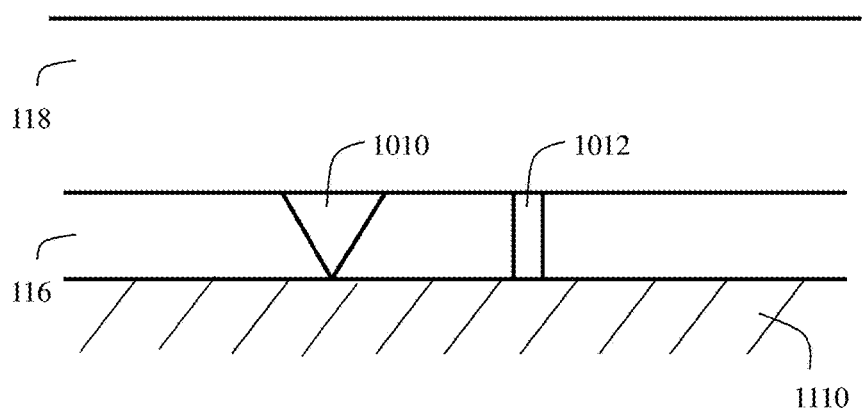
FIG. 11 is a view of the side of a novel static dissipative shoe showing two different geometries for conductive surface elements in an sole.

In other embodiments a conductive element such as conductive layer 122, conductive coating 212, extended conductive coating 214, conductive insert 410, 412, IMD film 418, eared conductive insert 510, conductive tape 910, is formed in a pointed shape and attached, using the methods and materials described hereinabove, to sole 112 of shoe 110. For example, referring to FIG. 10, pointed conductive element 1010 is formed as a triangular shape. Referring to FIG. 11, pointed conductive element 1010 may be incorporated into sole 112, and span side surface 116 of sole 112 in an orientation such that one point is directed towards a ground 1110 that a person would stand upon when wearing shoe 110. Pointed conductive element 1010 substantially extends from upper 118 to ground 1110. In another embodiment (not shown), one point may be directed towards upper 118. In yet another embodiment (not shown), a diamondshaped element may have one point directed towards ground 1110 and another point directed towards upper 118.

In another embodiment, one of conductive layer 122, conductive coating 212, extended conductive coating 214, conductive insert 410, 412, IMD film 418, eared conductive insert 510, conductive tape 910, is formed in a narrow shape and attached, using the methods and materials described hereinabove, to sole 112 of shoe 110. Here, the definition of narrow is that the width of the element is less that the thickness of sole 112. Referring to FIG. 10, an example of a narrow shape is line conductive element 1012. As shown in FIG. 11, line conductive element 1012 is formed as a narrow conductor incorporated into surface 116 of sole 112. Line conductive element 1012 substantially extends from upper 118 to ground 1110. The width of line conductive element 1012 may be in the range 0.001 inches to 1.000 inches.

In another embodiment (not shown), a narrow conductive element may have a wire shape or even be a wire, made of metal or any of the other conductive materials mentioned previously.

For each of conductive layer 122, conductive coating 212, extended conductive coating 214, conductive insert 410, 412, IMD film 418, eared conductive insert 510, conductive tape 910 having pointed or narrow shapes, the electric field intensity will be increased at the tip of each point, or at the narrow end of each shape, thereby providing more effective body discharging from shoe upper 118 to ground 1110. These constructions may also prove advantageous on bottom surface 114 of sole 112, if any part of bottom surface 114 is made conductive.

Color and material matching between a conductive element such as conductive layer 122, conductive coating 212, extended conductive coating 214, conductive insert 410, 412, IMD film 418, eared conductive insert 510, conductive tape 910, and non-conductive sole 112 may be facilitated by using the same polymer for the conductive element as for the underlying non-conducting sole 112 substrate, and modifying the polymer in the element intended to be conductive with a conductivity-enhancing additive.

Referring again to FIG. 1, in one embodiment, a portion of side surface 116 of sole 112 includes conductive layer 122 positioned adjacent to a porous part 119 of upper 118. This will help to ensure the highest conductance from the wearer's foot, through upper 118, to conductive layer 122 on side surface 116 of sole 112. Conductive elements (212, 214, 410, 412, 416, 1010, or 1012) of other embodiments described herein may be positioned adjacent to a porous part 119 of upper 118 in a similar manner.

Testing and Test Results

To test the effectiveness of the present invention, samples of men's athletic shoes were acquired. The samples included footwear made by five different manufacturers, including New Balance M373G, adidas Liquid Ride, Nike Flex 2014 RN, Dr. Scholl's M DS TUNDRA, and Starter Men's Cruiser. Multiple pairs of each shoe model were purchased; some shoes were left un-modified for comparison as a control. The shoes were tested by measuring a subject's body voltage with an ACL Model 300B electrostatic field locator during egress from a vehicle, and stepping out onto a variety of different ground surfaces, including asphalt, concrete, and hardpack gravel. During all tests the subject wore a jacket with a 55% raime, 45% cotton exterior shell. Raime is a bamboo fiber blend; results obtained with woolen jackets were found to be similar to those obtained with raime.

In a first test, a single 0.10" wide, 1.75" long track of conductive ink, similar in shape to line conductive element 1012 illustrated in FIGS. 10 and 11, was painted using a CAIG Laboratories CircuitWriter conductive pen across the exposed side surface 116 of sole 112 and extending slightly onto upper 118 on one of the shoes in a pair of Dr. Scholl's M DS TUNDRA shoes. The CircuitWriter ink is a silver-loaded conductive polymer that has a sheet conductivity of 0.02Ω per square per mil of thickness, and so produces relatively low resistance connections when used in its intended application—that is, making conductive tracks on rigid printed circuit boards. Although short segments of the track applied to the shoe measured in the low-single numbers of Ohms, the end-to-end resistance of the track measured >20.0 MΩ after the modified shoe was worn a few times, presumably due to hairline cracks in the conductive material cause by flexing of the shoe surface.

Figure 13:
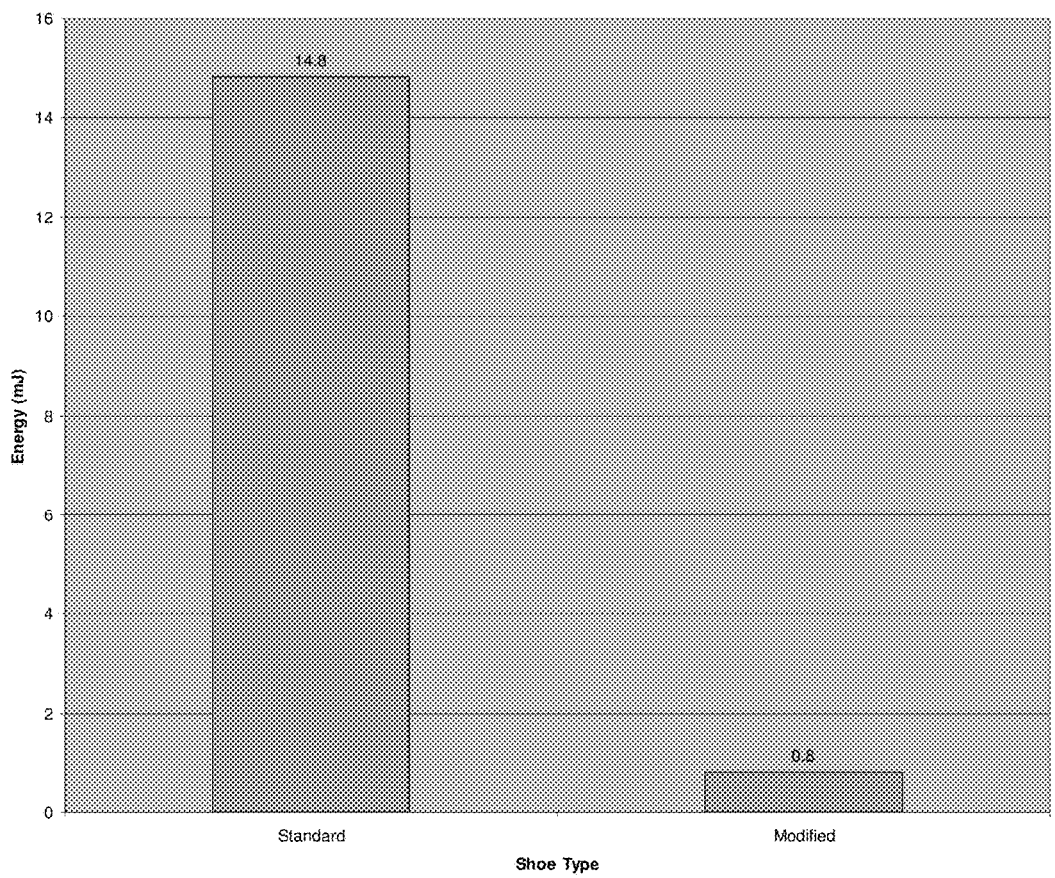
FIG. 13 is a bar chart of test results that show the effect of using a shoe whose sole edge has been bridged by a single 0.1" wide track of conductive coating on its surface.

Nevertheless, as seen in first bar graph 1300 in FIG. 13, electrostatic charge energies generated when stepping out of a vehicle onto a hardpack gravel driveway while wearing one un-modified shoe and the single modified shoe described above (with the single 0.1" wide vertical conductive track across side surface 116 of sole 112) were reduced by an average factor of 18.0. Charge energies were calculated by $$E_c = \frac{1}{2}CV_c^2$$

using measured body voltage $V_c$, and assuming a body capacitance C=100.0 pF. Energies were reduced by an even greater factor of 36.0 when wearing the modified shoe, if only the latter half of the series of 26 measurements are considered (this result is not shown in FIG. 4); presumably, in these latter tests, the vehicle seat had dried out, which yielded higher control voltages, but the upper on the modified shoe had collected some moisture, which yielded lower modified shoe voltages. Moreover, although the above numbers reflect the voltages that were measured immediately after exiting a vehicle (approximately 2.0 seconds after separating from the vehicle seat), when wearing the modified shoe, a test subject's body voltage rapidly decayed to an average value of <1.0 KV after about 5.0 seconds (this result is not shown in FIG. 4). An ESD at this voltage level is imperceptible, and is well below the voltage (2.0 KV) corresponding the MIE for a gasoline-air mixture.

This first group of tests, therefore, demonstrates that conductive bridging of side surface 116 of sole 112—even with a single 0.1" wide×1.75" long conductive track similar in shape to narrow line conductive element 1012 in FIGS. 10 and 11—produces a substantial reduction in ESD energies. It can be appreciated by one skilled in the art that providing only a small portion of exposed side surface 116 of sole 112 with a narrow conductive element will significantly diminish the dominant insulating barrier to body discharge.

In a second group of tests, exposed side surface 116 of sole 112 on each of the shoes in several pairs including Dr. Scholl's M DS TUNDRA, adidas Liquid Ride, New Balance 373, and Nike Flex 2014 Run, was painted with a thin coat of ACL Staticide 6300. Based on a surface resistivity value of ρ=50.0 MΩ per square, a sole perimeter w of 29.0 inches, and an average coating height h of 1.0 inch, the number of squares is calculated as $$s = \frac{h}{w} = 0.034 \text{ squares,}$$

and the resistance of the coating from the top of the sole edge to the bottom of the sole edge R is calculated as R=ρ·s=1.7 MΩ (this does not include upper resistance or ground contact resistance). The subject's body voltage was measured with an ACL Model 300B electrostatic field locator while wearing the shoe, together with an unmodified shoe, during egress from a vehicle, as before. The results of tests using these shoes are shown in second bar graph 1400 of FIG. 14. Leftmost group of bars 1402 represents average electrostatic energies measured immediately upon exiting the vehicle when using conventional, un-modified shoes; this is the control group. Middle group of bars 1404 represents average energies measured when wearing shoes whose sole side edges were modified by painting with ACL Staticide. Rightmost group of bars 1406 shows average energies measured using the same modified shoes as for the middle group of bars 1404, but after a longer interval of 5.0 seconds had elapsed. This data clearly shows that when wearing shoes modified by increasing the surface conductivity of only the exposed exterior side edges of the soles with a thin, almost transparent coating of a conductive polymer dispersion, ESD energies drop dramatically.

In a third group of tests, the exposed bottom surface 114 of sole 112 of a single, previously modified (side edge of sole previously painted) right-hand Dr. Scholl's shoe was painted with ACL Staticide 6300. The subject's body voltage was measured while wearing the shoe, together with an unmodified shoe, during egress from a vehicle with an ACL Model 300B electrostatic field locator, as before. The test results for this case are shown in third bar graph 1500 of FIG. 15. The three bars 1502, 1504, 1506, from left to right, represent average electrostatic energies over several trials for un-modified shoes, modified shoes, and modified shoes after 5.0 seconds, respectively. It is noteworthy that, in these trials, the energies consistently decayed to approximately zero after 5.0 seconds when wearing the further modified shoes (with the exposed bottom surface 114 of one sole 112 painted).

Although it will not wash off with water, the ACL Staticide 6300 used in the above described tests is recommended for indoor use by the manufacturer, partly because of sensitivity to the ultraviolet light in sunlight. A UV-cured conductive polymer coating may be substituted to improve the durability of this coating, if desired.

Figure 14:
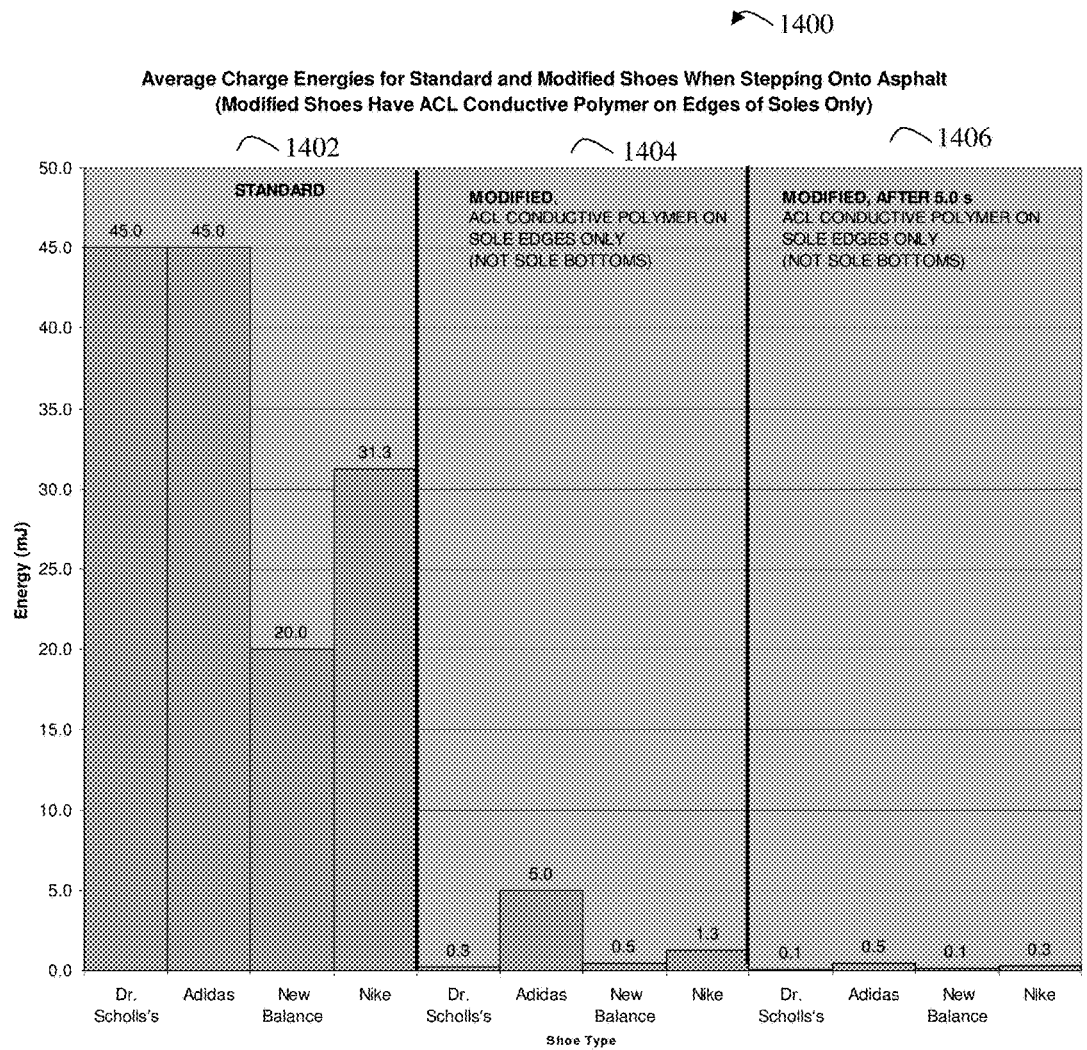
FIG. 14 is a bar chart of test results that show the effect of using footwear whose sole edges have been coated with a conductive polymer.
Figure 15:
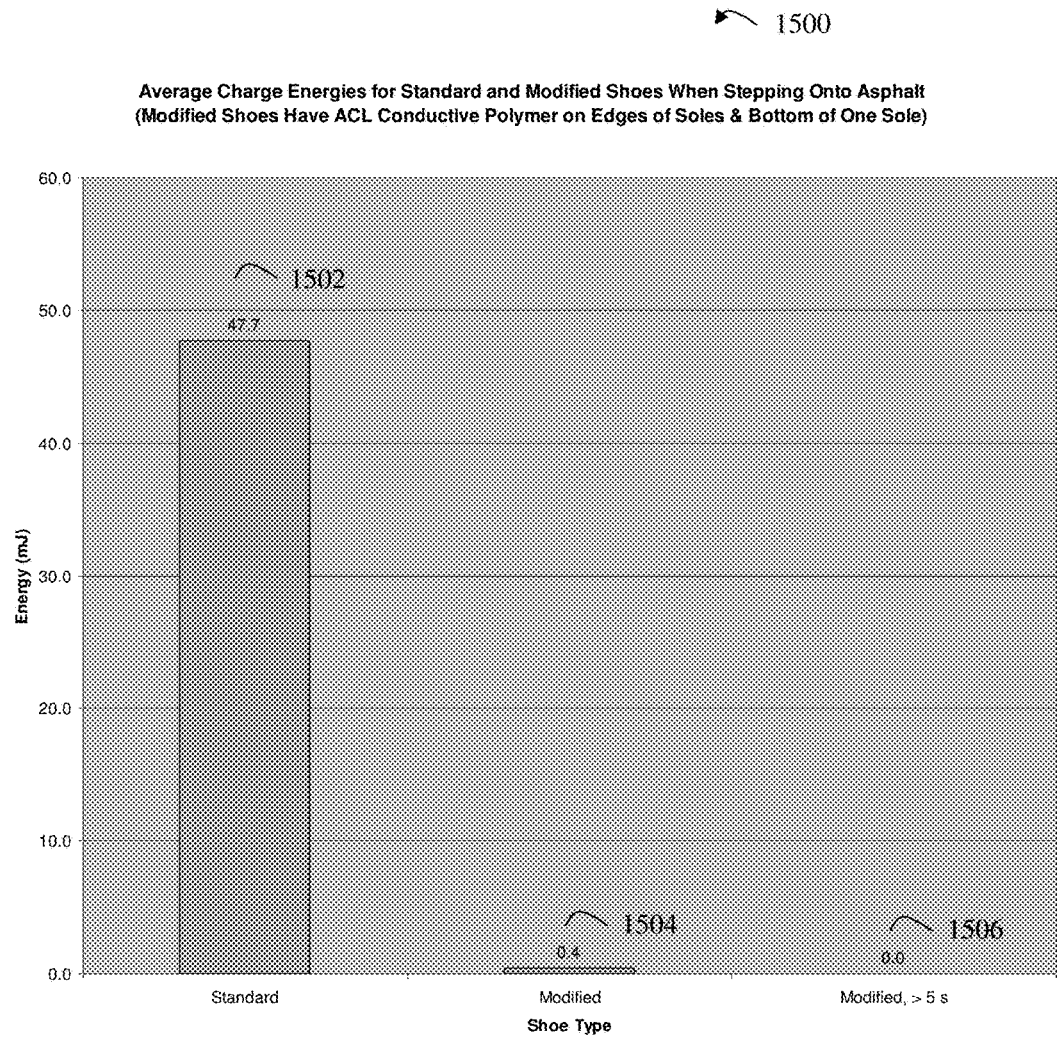
FIG. 15 is a bar chart of test results that show the effect of using footwear whose sole edge, as well as the bottom of one shoe, have been coated with a conductive polymer.

Dry, clean asphalt was the least conductive road surface tested, and so was the worst-case test surface in this application, thereby resulting in the highest measured charge energies. Nonetheless, the modified shoes were quite effective even with an asphalt surface, as the data of FIGS. 14 and 15 illustrate. This result is consistent with published conductivity and conductance numbers for asphalt at mild temperatures. Two other surfaces were tested on: a hardpack gravel surface (for which some data is shown in FIG. 13) and a concrete surface. When wearing un-modified shoes, these surfaces generated charge energies that were nearly as high as those generated with asphalt. Nonetheless, when the modified shoes were worn, the concrete and hardpack reduced the charge energies even more than for asphalt; in many tests, the initially measured energies were well below the limit of perceptibility, and rapidly decayed to almost zero.

The quality of the data in all of the forgoing tests was verified by alternately wearing modified and un-modified shoes in sequential test trials. There was high correlation between the modification status and the measured body voltages.

An understandable, but initially unexpected, result occurred during preliminary testing. The exposed side surface 116 of sole 112 was initially coated on just a left-hand Dr. Scholl's shoe with ACL Staticide 6300; the corresponding right-hand shoe was left un-modified. It was observed that, after several trials of charging and discharging the subject's body by entering and exiting a test vehicle while wearing these two shoes, that the un-modified right-hand shoe appeared very dirty and used. The un-modified shoe had attracted dust from vehicle carpets to exposed side surface 116 of sole 112, as well as attracting dust to a significant portion of upper 118. The modified left-hand shoe, in contrast, appeared very clean and new. This is because, when wearing un-modified shoes, the subject's body and the upper parts of the shoes attained high electrostatic voltages with respect to ambient surroundings, which attracted dust in those surroundings. In contrast, when wearing the modified shoes, the subject's voltage was close to that of the ambient surroundings, consequently attracting less dust. The difference in appearance was pronounced, indicating that the cleanliness, and, consequently, the appearance, of shoes may be substantially enhanced by the use of the disclosed invention in many situations.

To summarize, all of the shoe modifications and treatments described above reliably reduced measured human body electrostatic voltages and energies significantly during egress from vehicles. In contrast, the use of un-modified shoes allowed alarming levels of body charge to be attained, and allowed these high levels to be substantially preserved over surprising periods of time, even after walking distances of up to 100 feet.

Operation

Conventional static dissipative shoes designs understandably focus on providing a well-defined electrical conductance between the wearer's foot and the surface he or she stands upon. Some conventional designs use components that completely pierce the sole from the insole through the outsole with a conductive element. Other conventional designs use a sole whose volume is mostly or entirely composed of a conductive substance, and further connect that sole to a special conductive insole or another special electrode, located inside the shoe, with one or more dedicated conductive links. However, in the consumer application that the present invention addresses, it is unnecessary to include a dedicated conductive link to connect the sole to the interior of the shoe. Further, in most cases, it is unnecessary to make the entire volume of the sole conductive. Rather, increasing the surface conductivity of just certain portions of the exposed exterior surfaces of the sole may suffice.

Why will this work? One reason is that the uppers of many shoes have a much lower resistance, and much lower breakdown voltage, than the soles of those same shoes. This is particularly true for most sneakers and athletic shoes, which account for nearly half of the shoes sold in the U.S. each year (Packaged Facts, 2009, cited above). In these shoes, the uppers are often partially constructed of a breathable fabric, or an otherwise solid material that incorporates perforations. The breakdown voltage of such a breathable or perforated material is nominally reduced owing to the open air gaps in the material; air is usually a less effective insulator than a solid element of the upper material. Secondly, the surface resistivity and breakdown voltage of the material inside the perforations is typically inherently less than that that would be expected based just on a consideration of the volume resistivity for that material, owing to the contact with air, as described in greater detail below. The interior surfaces of the upper's perforations are also prone to conductive contamination, such as perspiration, that dramatically reduces the resistance and breakdown voltage of the upper. Even the stitching of ordinary thread through an upper is likely to decrease its resistance and breakdown voltage. Referring to the drawing of shoe 110 shown in FIG. 1, in all of the embodiments of the present invention, because exposed side surface 116 of sole 112 is typically very close to, or in contact with, upper 118, and because upper 118 is typically inherently somewhat conductive, just making exposed side surface 116 of sole 112 slightly conductive may suffice to provide an adequate electrical connection between the human body and ground.

More specifically, a second end 126 of conductive layer 122 (the upper edge of conductive layer 122 in FIG. 1) will be disposed in proximity to ground when worn. This proximity will provide a low resistance and breakdown voltage from ground to conductive layer 122. Continuing, this second end will be electrically connected by the middle of conductive layer 122 to a first end 124 of conductive layer 122 (the lower edge of conductive layer 122 in FIG. 1) that will be disposed in proximity to upper 118. This proximity will provide a low resistance and breakdown voltage from conductive layer 122 to upper 118. Upper 118 will connect to the wearer's body. This string of elements is the structure that will significantly increase the conductance of, and reduce the breakdown voltage of, the electrical connection between the body of the wearer and the surface he or she places his or her shod feet upon.

Sandals may also be amenable to modification with one or more embodiments, since sandals have only straps, in lieu of uppers. With sandals, it may be advantageous to make the surfaces of straps conductive, in addition to a side surface 116 of sole 112.

Another reason that most of the embodiments of the present invention are able to use much less conductive material in the sole than prior art designs is that the present invention takes advantage of the electrical characteristics of surfaces. Regarding the sole construction, it might seem that when a relatively small amount of conductive material is used in a thin layer on the perimeter of the sole, as in most of the embodiments, the resulting resistance would be much greater than would be obtained by making the entire volume of the sole from that same conductive material, because of the smaller cross-sectional area of the thin conductive layer. This effect is counteracted, however, by the fact that the surface resistivity of a material with an exposed surface is typically one or two orders of magnitude less than that that would be expected based on just the volume resistivity and the material thickness. Furthermore, in contrast to prior art designs, the present invention takes advantage of high-voltage breakdown along the outer surfaces of the shoe, especially on the sole. The breakdown voltage of an element with an exposed surface is much less than for an encapsulated element made from the same material. Additionally, high-voltage electrostatic breakdown is a non-linear process; once started, ionization and other processes will typically produce low-resistance arc tracks over the surface that tend to enhance the discharging process. Taking advantage of these surface characteristics allows the amount of conductive material to be radically reduced.

A third reason that the constructions of the present invention work is that the consumer market for shoes with SD qualities is somewhat different from the traditional market for SD shoes. A traditional market for existing SD-rated shoes, as explained above, is the workforce in integrated-circuit (IC) manufacturing facilities. In an IC manufacturing environment, electrostatic voltages as low as 50.0 V or less may cause damage to certain products, so standard SD-rated shoes must quickly and reliably reduce voltages below this level, else troubles will ensue. In contrast, the applications that the present invention addresses may allow somewhat higher residual voltages. For instance, to make ESD imperceptible to a person, body voltages only need be limited to about 2.0 KV. The same 2.0 KV voltage limit will suffice to maintain ESD spark energies below the MIE for gasoline-air mixtures. Furthermore, an occupant of a vehicle typically requires several footsteps, which take a second or two, to walk from the vehicle door to the vehicle fuel cap; this provides more time to discharge the occupant. Hence, the consumer application that the present invention addresses is less demanding than some of those addressed by fully-certified SD-rated footwear (and much less demanding than those addressed by so-called "Conductive" footwear, an even-more conductive footwear proscribed for professionals working in locations that routinely harbor flammable or explosive substances).

Regarding certification, although the conductances of shoes that use the present invention alone may or may not be consistently high enough to garner Static Dissipative (SD) certification under the standard ASTM F2413 that is used to assure the protection of sensitive electronics in manufacturing plants, the level of performance assured by that standard is not requisite for the benefits sought here. The embodiments reduce the maximum electrostatic voltages that a wearer would otherwise experience, owing to the deliberate increase of surface conductivity of the creepage surfaces on the exposed edges of the soles, as will be described in further detail below. The condition of these creepage surfaces is the dominant factor in determining the maximum electrostatic voltage that a shoe-wearing person will support; therefore, the maximum supportable voltage on a person wearing shoes that are modified in accordance with the invention will always be less than that for wearing standard shoes, unless 100.0% of the conductive surface material has been worn away or otherwise removed. The test results, disclosed above, show that the use of the present invention will typically mitigate perception of ESD, reduce spark energies closer to or below the MIE of a gasoline-air mixture, reduce the attraction of unsightly dirt and dust, and reduce static cling of garments. Therefore, incorporating the invention can only improve the overall performance of a shoe, and thereby increase consumer satisfaction.

There is nothing, however, to prevent the designs disclosed here from being profitably employed to construct lower-cost SD-rated footwear that is fully-certified per ASTM F2413—but any such proposed designs would have to be analyzed to prove that additional conductive components, such as conventional static dissipative midsoles, insoles, and uppers components, would not be required.

Figure 12:
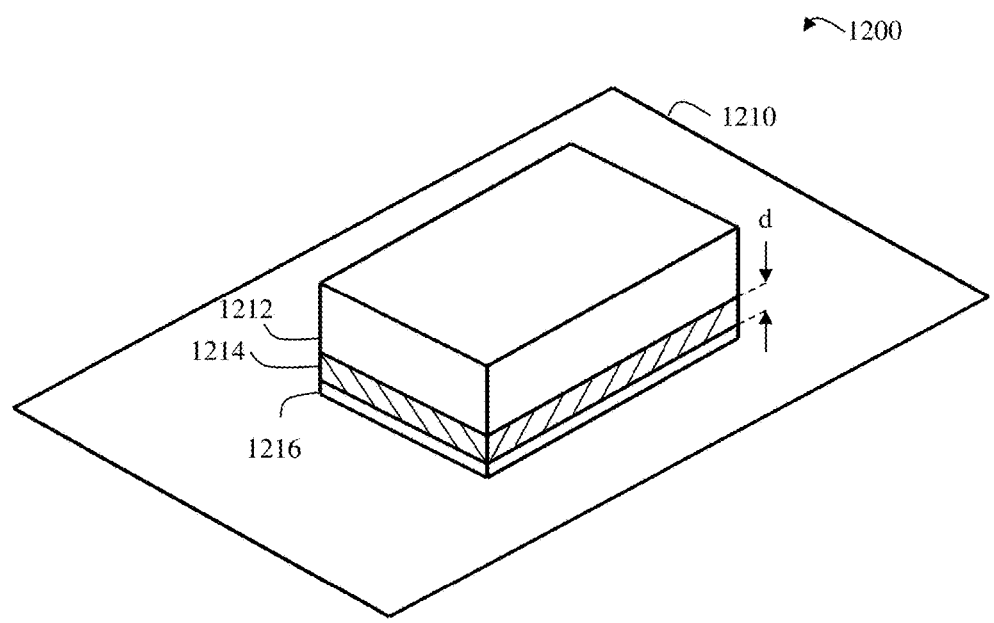
FIG. 12 is a stackup diagram of layers of conductors and insulators that affect the performance of an embodiment, in accordance with aspects of the present invention.

FIG. 12 is a stackup diagram of the relevant circuit components, which may be generally considered as a stack of layers of insulators and conductors. A relatively conductive human foot, sock, and shoe upper is represented by an upper region 1212. Ground 1210 is also typically relatively conductive. The dominant barrier to discharge in the case of most modern athletic shoes is an intervening insulating polymer sole layer 1214, indicated by the hatching in the drawing of FIG. 12. Sole layer 1214 may comprise an outsole and a midsole (not shown). Sole layer 1214 typically constitutes a much greater electrical barrier than upper region 1212 or the inner sole (not shown), in part because sole layer 1214 is typically thicker and less porous than the upper or the inner sole.

The rate and extent of discharge of a person will also be affected by the contact resistance 1216 between sole layer 1214 and ground 1210, which, in turn, may be affected by moisture or other contaminants on the ground 1210 or the sole layer 1214.

Sole layer 1214 is analogous to an insulating barrier that might be found in a high voltage system. In safety standards that apply to such systems, distance d is defined as creepage distance, or the minimum-distance path that may be traced over the surface of an insulating barrier that separates one conductor from another. In the present invention, this path is traced vertically along the exposed outside edge of sole layer 1214. A creepage path is often the weakest link in an insulating barrier, in part because the surface conductivity of the insulator is increased just by virtue of its contact with air, as explained above, but also because it may be subject to contamination by conductive foreign materials. In electrical power systems design, to address this weakness, a high-voltage insulator may be improved by using a corrugated or furrowed surface, so that any (undesired) leakage current traveling from one end of the insulator to the other is forced to traverse a serpentine path; the resultant creepage distance over such a serpentine path is much greater than that of the straight-line path over a flat surface, and consequently increases the breakdown voltage rating of the insulator considerably. In contrast, as is used to advantage in the present invention, it is desirable to weaken the insulating barrier. This could be done by decreasing creepage distance d; however, d is typically already dictated by the shoe design. Instead, the strategy of the present invention is to weaken the barrier by deliberately "contaminating" the creepage path with a conductive substance, thereby rendering the insulator unable to block leakage currents.

Referring to FIG. 1, shoe 110 has an upper 118 and a sole 112. Again, in modern shoes, sole 112 is often made from a relatively thick non-conductive polymer material that effectively insulates the body of the wearer from the ground. The basic premise of the present invention is that, in modern footwear, sole 112 typically constitutes the dominant insulating barrier between the human body and the ground, and all that is typically necessary to provide a sufficiently higher conductance connection between the foot and the ground in this application is to increase the surface conductivity of exposed side surface 116 of sole 112 (the side surface 116 whose conductivity is to be increased is designated by the vertically hatched area in FIG. 1). Furthermore, in many instances, it may suffice to increase surface conductivity on only a small portion of side surface 116.

A person typically feels no electrical shocking sensation as he or she is being electrostatically charged to a high electrostatic potential or voltage, although he or she may notice static cling of garments and hair. Rather, the sensation of being shocked is felt during the electrostatic discharge of one's body, and is caused by the surge of current surge associated with the discharge. Although a conductive discharge path is the essence of each of the embodiments, the use of too high a conductance will discharge the body in an unnecessarily short interval, leading to higher peak discharge currents and powers, and an increased perception of the feeling of electrical shock. In the event that the innate resistivity of the conductive elements in the shoes does not produce a connection between the human body and the earth with a resistance of at least 1.0 MΩ, it may be advantageous to reduce the conductivity of the conductive coating to produce a resistance in the range of 1.0 MΩ to 10.0 MΩ. This will reduce the peak current during an ESD, and thereby reduce the resultant feeling of electrical shock. The increased resistance will also enhance safety in the event that a line-powered 120 VAC or 240 VAC device is handled or inadvertently contacted while a user's shod feet are in contact with a highly conductive grounded surface, by limiting the maximum AC fault current to some tens of μA. Conductive polymers, conductive paints, and conductive inks are amenable to fail-safe adjustment of conductivity.

As was previously mentioned, the effectiveness of using SD footwear to mitigate ESD depends on having sufficient conductivity between the surface (the ground or the floor) that a person stands on and the earth. If that surface provides a resistance to earth of less than 100.0 MΩ or so, SD footwear will be effective. Typically, asphalt surfaces, concrete surfaces, moist soil, some interior flooring surfaces, and the surfaces of most gasoline filling station forecourts are conductive enough to be effective in this application.

As was mentioned earlier, shoes with porous or perforated uppers, as are found in most sneakers and athletic shoes, or shoes with uppers made from natural materials such as leather, may be most amenable to the incorporation of the present invention, since the uppers of such shoes will tend to have a lower electrical resistance and lower breakdown voltage between the foot and the upper edge of the exposed sole. In contrast, shoes with tall, highly insulating uppers, such as rubber boots, might require conventional SD shoe construction—incorporating conductive insoles, midsoles and outsoles, and perhaps conductive adhesives and dedicated conductive interconnections, for instance—in order to achieve SD qualities. However, none of these prior art measures were required for the Dr. Scholl's, adidas, New Balance, or Nike athletic shoes that were modified and tested.

Although unlike charges are produced whenever two dissimilar materials touch, the voltage and the energy of the associated charge distribution are close to zero as long as the two materials remain touching or very close to one another. Energy is imparted to the charge distribution, and the voltage of the charge distribution is increased, only when the unlike charges are mechanically moved apart from each other against the attractive Coulomb force, as the two materials are separated. This aspect may be illustrated by mathematical analysis of a simple parallel plate capacitor, which is an approximate model for a person that is very close to a vehicle, for instance. The well-known equations for capacitance, voltage, and stored energy for an ideal parallel plate capacitor are:

$$C = \frac{\varepsilon A}{d} \quad (1)$$

$$V_c = \frac{q}{C} \quad (2)$$

$$E_c = \frac{1}{2}CV_c^2 = \frac{1}{2C}q^2 \quad (3)$$

If such a capacitor is first charged, and the plates are then disconnected or insulated so that there are no paths by which the charge may leak away, the charge q will be constant. If the plates are then pushed apart so that the plate separation d is increased by, for example, a factor of 2, in Eqn. 1 the capacitance C will decrease by a factor of 2, and, consequently, in Eqn. 2 the voltage $V_c$ will increase by a factor of 2. It can be seen by inspecting Eqn. 3 that this will also cause the stored energy $E_c$ to increase by a factor of 2. Although this model is too simple to be very accurate for irregularly shaped, unequally charged objects, and will become less accurate as the distance between the charged objects increases, it clearly illustrates that the voltage and stored energy of a charge distribution increase as the distance between the unlike charges is increased, and that, at least for small separations, the voltage and energy tend to be proportional to the distance between the unlike charges.

Hence, the ultimate source of the ESD spark energy that shocks us during egress from vehicles, for instance, is our own human muscle power. That is, a small portion of the mechanical energy that a person expends while arising and exiting a vehicle is converted into electrostatic energy when he or she forces unlike charges apart from each other against the Coulomb force. The greater the distance of charge separation, the greater the stored energy. This principle has actually been frivolously employed by some in a prank to maximize their body voltage before shocking unsuspecting victims with an ESD, by jumping into the air before touching their victim. The principle was verified experimentally by having a subject step up onto an insulating bucket, thereby increasing his distance from the earth, after first being charged to a certain initial voltage, while standing on the ground. While standing on the bucket the subject's body voltage was significantly higher than while standing on the ground.

The discussion of the preceding paragraph is important in regard to body charging during egress from a vehicle, for example. In this case, a benefit associated with the use of SD shoes, including those incorporating the embodiments disclosed in this application, is that they tend to discharge the human body before the body and its associated charge move very far away from the corresponding opposite charge left behind on the surfaces of the vehicle. In fact, in many instances, a person's feet are in contact with the ground before his or her body completely separates from a vehicle seat. Consequently, any discharges that do occur tend to happen at a relatively low voltage and energy, and the sensation of being shocked is typically reduced or even eliminated.

The risk of fire during refueling of vehicles is also reduced, not only because of the significantly reduced spark energies, but also because of the likely location of any sparks. Volatile and dangerous air-fuel mixtures typically collect near the filler tube while a vehicle is being refueled. When shoes incorporating the present invention are worn, the sparks that occur, if any, tend to occur at locations that are somewhat removed from the fuel tank filler tube—that is, near vehicle door openings.

Although the system described herein is intended to mainly address the problems of human body charging, it is likely that the system will also help to mitigate safety issues associated with vehicle charging (as opposed to human body charging), if any. This is because, if a vehicle has not been sufficiently grounded through its tires, and does acquire a charge, a person wearing SD shoes tends to discharge the vehicle to the ground as he or she egresses. Any spark associated with that discharge is, again, usually remotely located from the gas tank filler pipe, i.e., discharge usually occurs at the vehicle doorways—thereby enhancing safety by reducing the likelihood of ignition of gasoline vapors.

Indoor ESD may also be mitigated by the use of SD footwear, provided that the indoor floor surface is even slightly conductive. Indoor surfaces made from concrete, stone, brick, or wood may be most effective in this regard.

Advantages

Shoes incorporating one or more of the embodiments will produce significantly greater discharging of the human body than that for standard, non-SD shoes. Even under the worst-case conditions, charge energies are typically reduced by one or two orders of magnitude.

As a result, shoes incorporating one or more of the embodiments will substantially provide the advantages of SD footwear, including attracting less dust than ordinary shoes, reducing the unsightly clinging of garments worn by a person, and reducing the number and intensity of unpleasant sensations of ESD shocks. The use of SD footwear will also dramatically reduce the risk of potentially deadly incendiary sparks due to ESD during vehicle egress, and will provide more consistent occupant discharging than almost any other method—especially when compared to methods or devices that require conscious manipulation.

Furthermore, the embodiments provide a number of unique advantages in comparison to conventional SD footwear construction.

One unique advantage relates to mechanical performance. Athletic footwear is typically highly optimized for mechanical characteristics; a shoe may include an outsole optimized for wear resistance, and a midsole optimized for cushioning, for example, and design for user comfort is paramount. An advantageous aspect of the embodiments is that they will have no discernable effect on the mechanical performance of the footwear to which they are applied.

Another unique advantage is that shoes incorporating the innovative features are less complicated and use many fewer specialized conductive parts than conventional SD shoes. A relatively small volume of specialized conductive material is applied to those parts of the shoe that have the greatest effect on the shoe's conductance and breakdown voltage. The ratio of the volume of the conductive element to the total volume of the sole can be as little as 0.0001%. This is important because conductive materials can be more expensive (per unit mass or volume) than conventional non-conductive materials. Therefore, the embodiments allow SD features to be incorporated at a lower cost than was previously attainable.

Yet another unique advantage of many of the embodiments is that no changes are required to the tooling of a conventional shoe in order to incorporate the present innovative features. In particular, an existing non-SD shoe configuration may be retrofitted with desirable SD qualities by simply adding a single step to the existing manufacturing process to produce several of the disclosed embodiments. Moreover, several of the disclosed embodiments may be used by manufacturers to retrofit existing stocks of finished shoes, or by consumers to treat existing shoes.

CONCLUSION, RAMIFICATIONS, AND SCOPE

This work has identified, for the first time, the most critical area for increasing the static dissipative qualities of a typical athletic shoe—that is, the exposed surface of the side edge of the sole. It has been demonstrated that the dominant electrical barrier that this side edge constitutes may be substantially diminished if the edge's surface conductivity is increased, even when this is done on only a small fraction of the periphery of the sole.

All of the embodiments differ markedly from those of prior art. Much prior art specifies a conductive composition for a significant portion of the solid volume of the sole, versus just certain exterior surfaces of the sole, as for most of the embodiments disclosed herein; furthermore, this prior art always further requires one or more additional specialized conductive components such as conductive insoles or uppers, conductive adhesives, and, in many cases, dedicated conductive wires or strips that connect the outsoles to the inner cavities of the shoes. The embodiments disclosed herein require no such additional special internal conductive components. Other prior art specifies increasing just the surface conductivity of the sole, but always in combination with one or more additional requisite special internal conductive components. Still other prior art specifies piercing the entire central thickness of a non-conductive sole lamination with conductive elements; this type of design, in particular, is liable to disadvantageously affect shoe shock absorption and comfort. Unlike for these prior art designs, none of the embodiments disclosed herein pierce or modify the insole or upper, or protrude into the interior cavity of the shoe with any new conductive component. In contrast, most embodiments of the present invention rely solely on the leakage paths from the foot through un-modified upper 118 to the top of exposed side surface 116 of sole 112 to make an adequate electrical connection from the human body to side surface 116 of sole 112. For this reason, the present invention is particularly well-suited for application to athletic shoes, as was previously discussed, and as was evident in the test results; it is evident that most athletic shoes could benefit from at least one of the embodiments disclosed herein.

Hence, satisfactory results are obtained when using the present invention, even while eliminating most of the elements specified for prior art static dissipative footwear.

In conclusion, by using the present invention, a compelling, proprietary new feature—static dissipation—may be introduced easily and quickly, and with low investment risk, into consumer footwear markets. This feature will give a shoe manufacturer a unique new selling point. The benefits of static dissipation will be easy to describe and demonstrate in advertisements, and consumers will instantly understand the benefits and crave them. These benefits, taken together with the low cost and smaller number of specialized parts used, the ease of incorporating the embodiments into new and existing shoe designs, and the lack of discernable effect on the mechanical performance of the footwear, will allow a manufacture to address a previously overlooked opportunity to differentiate entire lines of footwear.

Thus, the scope of the embodiments should be determined by the appended claims and their legal equivalents, rather than by the examples given.

Moreover, it is to be understood that the description herein is only exemplary of the invention, and is intended to provide an overview for the understanding of the nature and character of the disclosed ESD mitigation devices. The accompanying drawings are included to provide a further understanding of various features and embodiments of the method and devices of the invention which, together with their description serve to explain the principles and operation of the invention.

What is claimed is:

1. A device for adding static dissipative qualities to a shoe, consisting essentially of a conductive element that forms a portion of a side surface of a sole of the shoe, the conductive element having a first end proximal to an upper of the shoe, and having a second end proximal to a bottom surface of the sole, a volume of the conductive element constituting between 0.0001% and 10.0% of the total volume of the sole,
   whereby an electrostatic energy stored by a person wearing the shoe may be discharged to a ground via the conductive element.

2. The device of claim 1, wherein the conductive element is removably and replaceably attachable to the sole.

3. The device of claim 1, wherein the second end of the conductive element is configured to attach to a portion of the bottom surface of the sole,
   whereby the conductive element provides a conductive connection to the ground when the device is coupled to a shoe worn by a user of the device.

4. The device of claim 1, wherein the conductive element has a pointed shape,
   whereby the pointed shape reduces a breakdown voltage to the ground.

5. The device of claim 1, wherein the conductive element defines a line that is narrow with respect to the thickness of the sole, the line having a width in a range between about 0.001 inches to about 1.000 inches,
   whereby the line reduces a breakdown voltage to the ground.

6. The device of claim 1, wherein the conductive element is disposable on a portion of the sole that is proximate to at least one of the ball of the sole, or the heel of the sole, or a porous portion of the upper,
   whereby the disposition of the conductive element reduces a breakdown voltage to the ground.

7. The device of claim 1, wherein the material of the conductive element is selected from the group consisting of metal, metal foil, carbon fiber, conductive polymer, conductive ink, and conductive paint.

8. A method for adding static dissipative qualities to a shoe, consisting essentially of attaching a conductive element on a side surface of the sole of a shoe, the conductive element conforming generally to the shape of the side surface of the sole, the step of attaching including attaching a first end of the conductive element to the sole proximal to an upper of the shoe, and attaching a second end of the conductive element proximal to a bottom surface of the sole, a volume of the conductive element constituting between 0.0001% and 10.0% of the total volume of the sole, wherein the step of attaching further includes forming the conductive element by depositing a layer of conductive material on the side surface of the sole,
   whereby the element may be applied to an otherwise finished sole or even a sole attached to an otherwise finished shoe of new or existing design and manufacture with no tooling or process changes, except for the addition of a manufacturing step, thereby facilitating the retrofitting of static dissipative qualities to an existing shoe.

9. The method of claim 8, wherein the method further comprises depositing the layer by pad printing the conductive material onto the side surface of the sole.

10. The method of claim 8, wherein the method further comprises depositing the layer by hot stamping the conductive material onto the side surface of the sole.

11. The method of claim 8, wherein the method further comprises depositing the layer by heat transfer printing the conductive material onto the side surface of the sole.

12. The method of claim 8, wherein the method further comprises depositing the layer by painting the conductive material onto the side surface of the sole.

13. A method for adding static dissipative qualities to a shoe, consisting essentially of attaching a conductive element on a side surface of the sole of a shoe, the conductive element conforming generally to the shape of the side surface of the sole, the step of attaching including attaching a first end of the conductive element to the sole proximal to an upper of the shoe, and attaching a second end of the conductive element proximal to a bottom surface of the sole, a volume of the conductive element constituting between 0.0001% and 10.0% of the total volume of the sole, wherein the method further comprises forming the conductive element by:
   a. depositing a coating of conductive material in a cavity of a mold used for the fabrication of the sole that corresponds to at least a portion of the side surface of the sole,
   b. filling the mold with a material for forming the sole, and
   c. curing or cooling the materials of the sole, thereby attaching the conductive material to the sole.

14. The method of claim 13, wherein the forming comprises an in mold coating process using a conductive coating material.

15. A method for adding static dissipative qualities to a shoe, consisting essentially of attaching a conductive element on a side surface of the sole of a shoe, the conductive element conforming generally to the shape of the side surface of the sole, the step of attaching including attaching a first end of the conductive element to the sole proximal to an upper of the shoe, and attaching a second end of the conductive element proximal to a bottom surface of the sole, a volume of the conductive element constituting between 0.0001% and 10.0% of the total volume of the sole, wherein the method further comprises forming the conductive element by:
   a. fabricating a pre-formed conductive insert,
   b. placing the pre-formed conductive insert in a cavity of a mold used for the fabrication of the sole, on that part of the cavity that corresponds to at least a portion of the side surface of the sole,
   c. filling the mold with conventional material, and
   d. curing or cooling the materials of the sole,
   whereby the conductive insert may be applied to a shoe of new or existing design and manufacture with no tooling or process changes, except for the addition of an intermediate manufacturing step, thereby facilitating the retrofitting of static dissipative qualities to an existing shoe design, while increasing the durability of the element.

16. The method of claim 15, wherein the pre formed conductive insert comprises a thin dry polymer film or an in mold decoration foil.

17. A method for adding static dissipative qualities to a shoe, consisting essentially of attaching a conductive element on a side surface of the sole of a shoe, the conductive element conforming generally to the shape of the side surface of the sole, the step of attaching including attaching a first end of the conductive element to the sole proximal to an upper of the shoe, and attaching a second end of the conductive element proximal to a bottom surface of the sole, a volume of the conductive element constituting between 0.0001% and 10.0% of the total volume of the sole, wherein the method further comprises forming the conductive element by:
   a. fabricating a pre-formed conductive insert,
   b. fabricating a mold attachment with a shape similar to that of the pre-formed conductive insert,
   c. fastening the mold attachment to a cavity of a mold used for the fabrication of the sole,
   d. filling the mold with a material for forming the sole,
   e. curing or cooling the material of the sole,
   f. removing the sole from the mold, and
   g. fastening the pre-formed conductive insert into a void in the sole caused by the mold attachment.

18. A shoe that includes a device for adding static dissipative qualities to the shoe, the device consisting essentially of a conductive element that forms a portion of a side surface of a sole of the shoe, the conductive element having a first end proximal to an upper of the shoe, and having a second end proximal to a bottom surface of the sole, a volume of the conductive element constituting between 0.0001% and 10.0% of the total volume of the sole,
   whereby an electrostatic energy stored by a person wearing the shoe may be discharged to a ground via the conductive element.

* * * * *